US007020162B2

(12) United States Patent
Iwasaki et al.

(10) Patent No.: US 7,020,162 B2
(45) Date of Patent: Mar. 28, 2006

(54) OPTICAL DISTRIBUTION NETWORK SYSTEM WITH LARGE USABLE BANDWIDTH FOR DBA

(75) Inventors: Mitsuyoshi Iwasaki, Tokyo (JP); Toshikazu Yoshida, Tokyo (JP); Yoshihiro Asashiba, Tokyo (JP); Hiroshi Ichibangase, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 742 days.

(21) Appl. No.: 09/942,560

(22) Filed: Aug. 31, 2001

(65) Prior Publication Data

US 2002/0027682 A1 Mar. 7, 2002

(30) Foreign Application Priority Data

Sep. 1, 2000 (JP) ............................ 2000-265928

(51) Int. Cl.
*H04L 12/28* (2006.01)
*H04J 3/16* (2006.01)
*H04J 3/18* (2006.01)
*H04J 14/00* (2006.01)

(52) U.S. Cl. ................ 370/468; 370/395.41; 370/477; 398/45; 398/58

(58) Field of Classification Search ................ 370/230, 370/235, 232, 233, 234, 468, 252, 390, 389, 370/395.4, 395.21, 395.41, 400, 477, 350, 370/392; 398/45, 58, 43, 57
See application file for complete search history.

(56) References Cited

U.S. PATENT DOCUMENTS 5,130,982 A 7/1992 Ash et al.
5,548,639 A 8/1996 Ogura et al.
5,867,502 A 2/1999 Chang
6,108,112 A * 8/2000 Touma ........................ 398/10
6,317,234 B1 * 11/2001 Quayle .......................... 398/9

(Continued)

FOREIGN PATENT DOCUMENTS

EP 0 961 522 12/1999

(Continued)

OTHER PUBLICATIONS

"Series G: Transmission Systems and Media, Digital Systems and Networks" "Broadband Optical Access Systems Based on Passive Optical Networks (PON)", ITU-T G-Series Recommendations, G.983.1, Oct. 98, pp. 1-5, 1, & 114-118.

(Continued)

*Primary Examiner*—Hanh Nguyen
(74) *Attorney, Agent, or Firm*—Oblon, Spivak, McClelland, Maier & Neustadt, P.C.

(57) ABSTRACT

An optical distribution network system includes an OLT; a plurality of ONUs; a first optical network and a second optical network, one of which connects the OLT with the plurality of ONUs; and a bandwidth controller. The bandwidth controller apportions the plurality of ONUs between the first optical network and the second optical network, assigns a predetermined transmission bandwidth to each of the plurality of ONUs, and accepts a bandwidth change of the transmission bandwidth. It solves a problem of a conventional optical distribution network system in that the maximum bandwidth available by DBA (dynamic bandwidth assignment) is equal to the total transmission bandwidth of working side minus the sum total of the minimum cell rates of the ONUs, and hence it cannot secure a large usable bandwidth for DBA, when congestion of bandwidth increase takes place among the plurality of ONUs.

19 Claims, 13 Drawing Sheets

U.S. PATENT DOCUMENTS

| | | | | |
|---|---|---|---|---|
| 6,434,164 | B1 * | 8/2002 | Matsunaga et al. | 370/443 |
| 6,463,075 | B1 * | 10/2002 | Hoebeke | 370/458 |
| 6,567,579 | B1 * | 5/2003 | Foltzer | 385/24 |
| 6,658,457 | B1 * | 12/2003 | Nishikawa et al. | 709/206 |
| 6,757,251 | B1 * | 6/2004 | Nakaishi | 370/236.2 |
| 2003/0039211 | A1 * | 2/2003 | Hvostov et al. | 370/230 |

FOREIGN PATENT DOCUMENTS

| | | |
|---|---|---|
| JP | 10-224421 | 8/1998 |
| JP | 10-276204 | 10/1998 |
| JP | 11-122172 | 4/1999 |
| JP | 2000-312208 | 11/2000 |
| JP | 2001-119411 | 4/2001 |
| WO | WO 97/50277 | 12/1997 |
| WO | WO 99/43184 | 8/1999 |

OTHER PUBLICATIONS

U.S. Appl. No. 09/942,560, filed Aug. 31, 2001, pending.
U.S. Appl. No. 09/942,567, filed Aug. 31, 2001, pending.

* cited by examiner

OPTICAL DISTRIBUTION NETWORK SYSTEM WITH LARGE USABLE BANDWIDTH FOR DBA

BACKGROUND OF THE INVENTION

1. Field of the Invention

The present invention relates to an optical distribution network system for operating DBA (Dynamic Bandwidth Assignment) in a duplex optical distribution section such as a PDS (Passive Double Star) section.

2. Description of Related Art

A conventional optical distribution network system is disclosed in Japanese patent application laid-open No. 11-122172/1999, or specified in ITU-T (International Telecommunication Union-Telecommunication) Recommendation G.983.1, for example.

FIG. 11 is a diagram showing a conventional optical distribution network system defined in ITU-T Recommendation G.983.1. In this figure, the reference numeral 1 designates an optical line termination (abbreviated to "OLT" from now on), reference numerals 2-1–2-*n* each designate an optical network unit (abbreviated to "ONU" from now on), and 3 designates an optical splitter.

Next, the operation of the conventional system will be described.

In the ITU-T Recommendation G.983.1, a downstream optical signal from the OLT 1 is split by the optical splitter 3 to be broadcast to the ONUs 2-1–2-*n*.

On the other hand, upstream signals from the ONUs 2-1–2-*n* are multiplexed by the optical splitter 3 to be transmitted to the OLT 1. In the course of this, to multiplex the upstream signals from the ONUs 2-1–2-*n* on the optical splitter 3, access control (delay control) is carried out. The delay control is also described in the ITU-T Recommendation G.983.1.

FIG. 12 is a block diagram showing a detailed configuration of the optical distribution network system of FIG. 11. In this figure, the reference numeral 11 designates a delay measurement cell generation controller, 12 designates an OAM (Operation Administration and Maintenance) cell multiplexer, 13 designates a transmitting/receiving section, 14 designates a state controller, 15 designates an OAM cell demultiplexer, 16 designates a delay measurement section, 17 designates a delay correcting section, 21 designates a transmitting/receiving section, 22 designates a frame synchronization section, 23 designates an OAM cell demultiplexer, 24 designates a delay setting section, 25 designates a buffer memory, 26 designates a state controller, and 27 designates an OAM cell multiplexer.

The optical distribution network system as shown in FIG. 12 carries out a sequence called ranging at each start-up of the ONU.

The ranging is carried out as follows. First, in the OLT 1, the delay measurement cell generation controller 11 generates delay measurement cells for particular ONUs 2-1–2-*n*.

The grant of the delay measurement cells generated by the delay measurement cell generation controller 11 are each multiplexed into downstream main data as an OAM cell by the OAM cell multiplexer 12 to be transmitted to the ONUs 2-1–2-*n* through the transmitting/receiving section 13 including an optical transceiver and a WDM (Wavelength Division Multiplexing) coupler.

Each of the ONUs 2-1–2-*n* converts the received optical signal to an electric signal by the transmitting/receiving section 21 including an optical transceiver and a WDM coupler.

The electric signal is fed to the frame synchronization section 22 that regularly inserts frame synchronization bits into OAM cells, which enable the frame synchronization to be established and the cell delimiter of each cell to be identified.

For example, the OAM cell demultiplexer 23 of the ONU 2-1 identifies incoming data cells and OAM cells, and separates them. The delay setting section 24, recognizing the grant of delay measurement cells in the isolated OAM cells, immediately notifies the OAM cell multiplexer 27 of it to transmit a delay measurement cell as a response to the OLT 1 via the transmitting/receiving section 21 and the optical splitter 3. Thus, receiving the delay measurement cell, the ONU 2-1 sends the response immediately back to the OLT 1.

On the other hand, the OAM cell demultiplexer 15 of the OLT 1 separates the OAM cells from the data cell.

The delay measurement section 16, detecting the delay measurement cell separated by the OAM cell demultiplexer 15, measures a round-trip delay by the response of the delay measurement cell. The round-trip delay is a time period between the transmission and reception of the cell by the OLT 1, during which the cell is transmitted to the ONU 2-1 via the optical splitter 3, and is sent back to the OLT 1.

The delay measurement cell generation controller 11 computes the delay between the OLT 1 and the ONU 2-1 from the round-trip delay, generates a delay measurement value information including information about the delay, and supplies it to the OAM cell multiplexer 12. The OAM cell multiplexer 12 inserts the delay measurement value information to an OAM cell to be transmitted to the ONU 2-1 by the transmitting/receiving section 13.

Receiving the OAM cell including the delay measurement value information, the OAM cell demultiplexer 23 of the ONU 2-1 isolates the OAM cell. When the OAM cell includes the delay measurement value information, the delay setting section 24 controls the beginning of the cell reading from the buffer memory 25 with this delay measurement value information. Thus, the multiple ONUs can each set the transmission timing to the OLT 1 considering the delay time, so that the multiplexing can be performed in order, and the upstream optical transmission is carried out normally. The state controllers 14 and 26 make a decision that the party is in an operating state when the cell is sent back within the normal location, followed by measuring the delay amount of the upstream cell, by fine adjustment of the delay amount of the cell by the delay correcting section 17, whereas when the cell is not sent back within the normal location, they make a decision that the party is in an abnormal condition.

The ITU-T Recommendation G.983.1 also defines a duplex optical distribution network system as shown in FIG. 13, which completely doubles the OLTs, the ONUs and the components between them. The duplex optical distribution network system comprises instead of the OLT 1 as shown in FIG. 11, an OLT 1*a* as an working side and an OLT 1*b* as a standby side, which are connected to the optical splitters 3*a* and 3*b*. In addition, instead of the ONUs 2-1–2-*n* as shown in FIG. 11, it comprises ONUs 2-1*a*–2-*na* as the working side, and ONU 2-1*b*–2-*nb* as the standby side, which are connected to the optical splitters 3*a* and 3*b*.

Then, optical fibers interconnect the optical splitters 3*a* and 3*b* with the OLTs 1*a* and 1*b*, and the optical splitters 3*a* and 3*b* with the ONUs 2-1*a*–2-*na* and 2-1*b*–2-*nb*.

The duplex optical distribution network system sometimes uses a technique called DBA (Dynamic Bandwidth Assignment) that operates as follows:

FIG. 14 is a diagram illustrating an outline of the bandwidth assignment by the DBA.

As for each of the ONUs 2-1*a*–2-*na*, a minimum cell rate (an available traffic bandwidth without exception) and a peak cell rate (a traffic bandwidth of a maximum possible transmission which is not necessarily assured) are set by contract.

When a 0-system is the working side, the sum total of the minimum cell rates of the ONUs 2-1*a*–2-*na* are secured on the 0-system transmission line without fail. A usable bandwidth for DBA (the total transmission capacity—the sum total of the minimum cell rates of the ONUs) as shown in FIG. 14 can be used in common by the ONUs 2-1*a*–2-*na*.

If an upstream cell bandwidth from the ONU is about to exceed the established bandwidth (equals the minimum cell rate here), a bandwidth monitor in the OLT 1*a* installed for each of the ONUs 2-1*a*–2-*na* detects it. For example, the bandwidth monitor measures the bandwidth of the cells by counting the number of incoming cells in a fixed time period, which are transmitted from each of the ONUs 2-1*a*–2-*na* to the OLT.

Then, the OLT 1*a* increases the bandwidth of the ONU within the usable bandwidth for DBA in such a way that the OLT 1*a* notifies the ONUs 2-1*a*–2-*na* of the reassigned bandwidth so that the ONUs 2-1*a*–2-*na* can change the transmission traffic bandwidth. This enables the OLT 1*a* to dynamically assign additional bandwidths to some ONUs 2-1*a*–2-*na* that require a bandwidth greater than the minimum cell rate.

When the ONUs 2-1*a*–2-*na* that are assigned the additional bandwidths are congested, the congested ONUs apportion the bandwidths among them within the usable bandwidth for DBA.

Thus, in the event of the congestion, not all the congested ONUs can secure a sufficient bandwidth because the sum total of the peak cell rates of the ONUs 2-1*a*–2-*na* would exceed the total transmission capacity in such a case.

In contrast, when a particular ONU decreases its upstream cell bandwidth below the increased bandwidth, it can be reduced with ensuring the minimum cell rate.

With the foregoing configuration where the OLTs and the ONUs are duplexed as shown in FIG. 13, the conventional optical distribution network system secures the transmission bandwidths of all the ONUs 2-1–2-*n* within the bandwidth of the 0-system OLT 1*a* (when the 0-system is the working side) at the startup of the system. Accordingly, the maximum additional bandwidth available by the DBA equals the total transmission bandwidth of the working side minus the sum total of the minimum cell rates of the ONUs 2-1*a*–2-*na*. This presents a problem of being unable to secure a large usable bandwidth for DBA when the ONUs 2-1*a*–2-*na* congest because of increasing bandwidths (because the bandwidth of the 1-system remains unused).

SUMMARY OF THE INVENTION

The present invention is implemented to solve the foregoing problem. It is therefore an object of the present invention to provide an optical distribution network system enabling ONUs to secure a large usable bandwidth in the DBA operation.

According to a first object of the present invention, there is provide an optical distribution network system comprising: an OLT; a plurality of ONUS; a first optical network and a second optical network, one of which connects the OLT with the plurality of ONUS; and bandwidth control means for apportioning the plurality of ONUs between the first optical network and the second optical network, for assigning a predetermined transmission bandwidth to each of the plurality of ONUS, and for accepting a bandwidth change of the transmission bandwidth.

Here, when a failure occurs in one of the first optical network and the second optical network, the bandwidth control means may assign all transmission bandwidths of the ONUs to the other optical network.

When a failure occurs in a working side ONU of the plurality of ONUs, the bandwidth control means may switch the working side ONU to a standby side, and switch a standby side ONU to the working side.

When apportionment balance is lost of the plurality of ONUs between the first optical network and the second optical network, the bandwidth control means may carry out apportionment of the plurality of ONUs between the first optical network and the second optical network, again.

The bandwidth control means may assign a minimum cell rate to each of the plurality of ONUs.

The bandwidth control means may apportion each of the plurality of ONUs to one of the first optical network and the second optical network such that a sum total of minimum cell rates of the ONUs in the first optical network becomes nearly equal to a sum total of minimum cell rates of the ONUs in the second optical network.

The bandwidth control means may apportion each of the plurality of ONUs to one of the first optical network and the second optical network such that a sum total of peak cell rates of the ONUs in the first optical network becomes nearly equal to a sum total of peak cell rates of the ONUs in the second optical network.

The bandwidth control means may apportion each of the plurality of ONUs to one of the first optical network and the second optical network such that a sum total of differences between peak cell rates and minimum cell rates of the ONUs in the first optical network becomes nearly equal to a sum total of differences between peak cell rates and minimum cell rates of the ONUs in the second optical network.

The bandwidth control means may apportion each of the plurality of ONUs to one of the first optical network and the second optical network such that a sum total of established bandwidths of the ONUs in the first optical network becomes nearly equal to a sum total of established bandwidths of the ONUs in the second optical network.

According to second aspect of the present invention, there is provided an optical distribution network system comprising: an OLT; a plurality of ONUs; a first optical network and a second optical network, one of which connects the OLT with the plurality of ONUS; and bandwidth control means for apportioning a plurality of paths contained in the plurality of ONUs between the first optical network and the second optical network, for assigning a predetermined transmission bandwidth to each of the path, and for accepting a bandwidth change of the transmission bandwidth.

Here, when a failure occurs in one of the first optical network and the second optical network, the bandwidth control means may assign all the paths contained in the plurality of ONUs to the other optical network.

When a failure occurs in a working side path of the plurality of paths, the bandwidth control means may switch the working side path to a standby side, and switch a standby side path to the working side.

When apportionment balance is lost of the plurality of paths between the first optical network and the second optical network, the bandwidth control means may carry out apportionment of the plurality of paths between the first optical network and the second optical network, again.

The bandwidth control means may assign a minimum cell rate to each of the plurality of paths.

The bandwidth control means may apportion each of the plurality of paths to one of the first optical network and the second optical network such that a sum total of minimum cell rates of the paths in the first optical network becomes nearly equal to a sum total of minimum cell rates of the paths in the second optical network.

The bandwidth control means may apportion each of the plurality of ONUs to one of the first optical network and the second optical network such that a sum total of peak cell rates of the paths in the first optical network becomes nearly equal to a sum total of peak cell rates of the paths in the second optical network.

The bandwidth control means may apportion each of the plurality of paths to one of the first optical network and the second optical network such that a sum total of differences between peak cell rates and minimum cell rates of the paths in the first optical network becomes nearly equal to a sum total of differences between peak cell rates and minimum cell rates of the paths in the second optical network.

The bandwidth control means may apportion each of the plurality of ONUs to one of the first optical network and the second optical network such that a sum total of established bandwidths of the paths in the first optical network becomes nearly equal to a sum total of established bandwidths of the paths in the second optical network.

DETAILED DESCRIPTION OF THE PREFERRED EMBODIMENTS

The invention will now be described with reference to the accompanying drawings.

Embodiment 1

Figure 4:
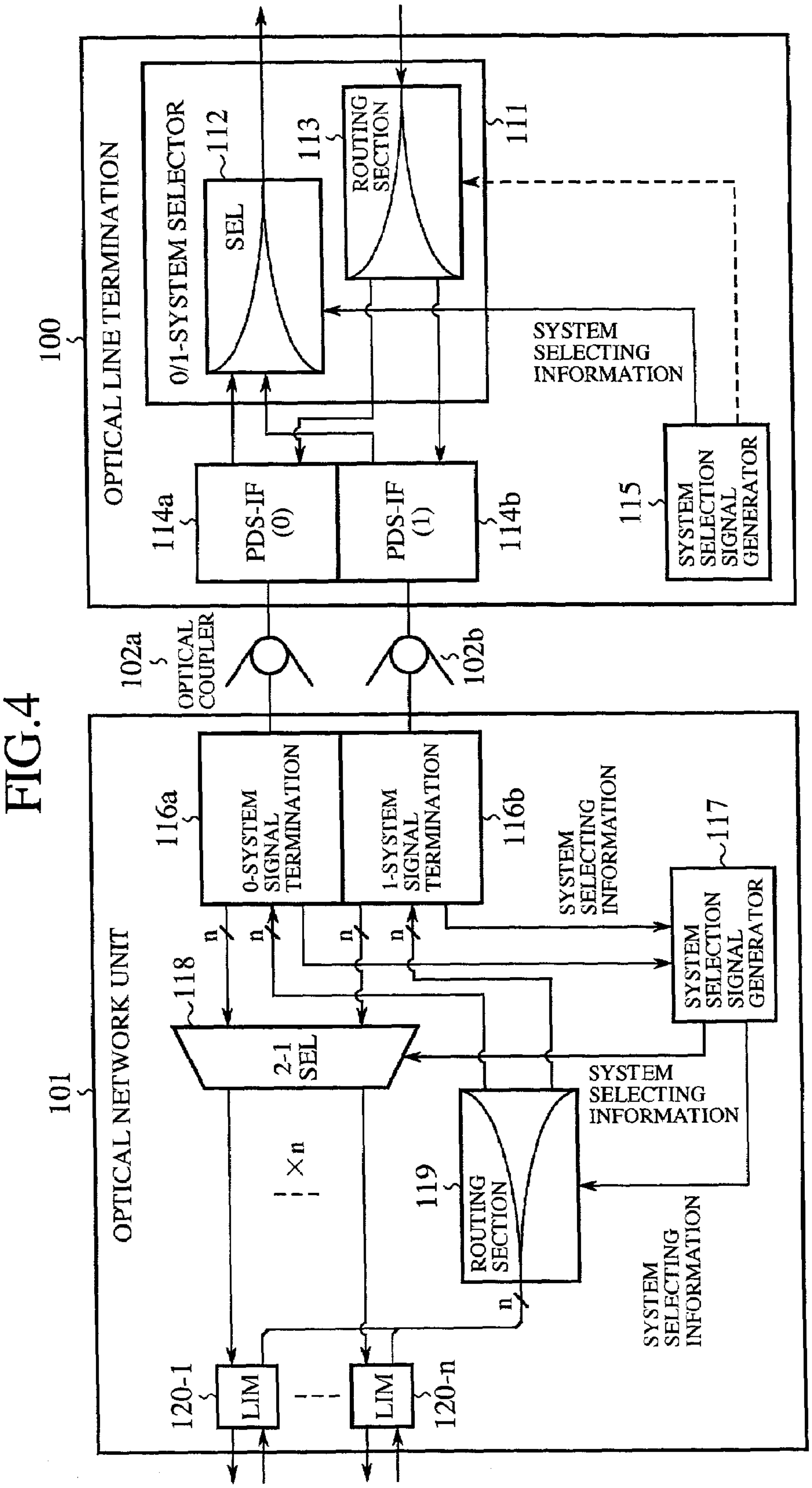
FIG. 4 is a block diagram showing a configuration of a duplex optical distribution system that carries out branch switching in accordance with the present invention.

First, a branch switching configuration will be outlined which is one of the duplex switching systems constituting a basic configuration of the present embodiment 1. FIG. 4 is a block diagram showing a configuration of a duplex optical distribution system that carries out the branch switching. In this figure, the reference numeral 100 designates an OLT, 101 designates an ONU, 102*a* and 102*b* designate an optical coupler, 111 designates a 0/1-system selecting section, 112 designates a selector, 113 designates a routing section, 114*a* designates a PDS-IF(0) (PDS interface), 114*b* designates a PDS-IF(1) (PDS interface), 115 designates a system selection signal generator, 116*a* designates a 0-system signal termination, 116*b* designates a 1-system signal termination, 117 designates a system selection signal generator, 118 designates a 2-1 selector, 119 designates a routing section, 120-1–120-*n* each designate an LIM (Line Interface Module) which is a detachable/attachable interface card for each service.

Next, the operation of the present embodiment 1 will be described.

In the branch switching, the OLT 100 switches the ONUs one by one independently (in contrast to the branch switching, there is a configuration called tree switching in which the OLT switches all the ONUs to the 0-system or to the 1-system at once). Thus, in the branching switching, it is not unlikely that a particular ONU uses the 0-system transmission line as the working side, but another ONU employs the 1-system transmission line as the working side.

In FIG. 4, the ONU 101 and the OLT 100 are connected through the optical couplers 102*a* and 102*b*. In the ONU 101, the optical couplers 102*a* and 102*b* are connected to the 0-system signal termination 116*a* and the 1-system signal termination 116*b* via optical fibers, respectively, to process downstream signals sent from the OLT 100, thereby providing n signals with separate services associated with the n LIMs, where n is the number of the LIMs.

In addition, the 0-system signal termination 116*a* and the 1-system signal termination 116*b* each extract system selection information on the 0/1-system transmission lines from the OAM cell of the downstream signals, and transmit to the OLT 100 an upstream signal into which n signals, each of which is associated with one of n LIMs, are multiplexed.

The system selection signal generator 117 receives the system selection information on the 0/1-system transmission lines from the 0-system signal termination 116*a* and 1-system signal termination 116*b*, and supplies it to the 2-1 selector 118 for selecting downstream signals, and to the upstream routing section 119.

The 2-1 selector 118 for selecting the downstream signals selects one of two sets of n signals supplied from the 0-system signal termination 116*a* and 1-system signal termination 116*b* in response to the selection information fed from the system selection signal generator 117, and transmits the selected signals to the corresponding LIMs.

The routing section 119 routes a set of n upstream signals LIM1–LIMn to either the 0-system signal termination 116*a* or 1-system signal termination 116*b* in response to the system selection information fed from the system selection signal generator 117.

The PDS-IF(0) 114*a* and PDS-IF(1) 114*b* of the OLT 100 are connected to the optical couplers 102*a* and 102*b* through optical fibers.

The system selection signal generator 115 generates system selection information from information about a fault of the transmission line or the like. For example, if a transmission line failure of the 0-system is detected in a particular ONU, and when the 1-system transmission line is normal, the system selection signal generator 115 generates the system selection information to switch the ONU to the 1-system, or vice versa. Then, the system selection signal generator 115 supplies the system selection information to the upstream signal selector 112 and to the downstream routing section 113.

The selector 112 selects one of the signals supplied from the PDS-IF(0) 114*a* and PDS-IF(1) 114*b* on one-by-one basis of the ONUs in response to the system selection information on the 0/1-system transmission line fed from the system selection signal generator 115 (the system selection information is multiplexed into each cell).

The routing section 113 routes the incoming signal to one of the PDS-IF(0) 114*a* and PDS-IF(1) 114*b* on a one-by-one basis of the ONUs in response to the system selection information fed from the system selection signal generator 115.

Next, a concrete operation will be described taking an example where two ONUs #1 and #2 are connected to the OLT 100.

Assume that the ONU #1 uses the 0-system as the working side, and the ONU #2 employs the 1-system as the working side. In this case, in the ONU #1, the system selection signal generator 117 extracts the system selection information for selecting the 0-system from the downstream signals (OAM cells), and supplies it to the 2-1 selector 118 and routing section 119, so that the upstream signals are sent to the 0-system, and the downstream signals are selected from the 0-system.

In the ONU #2, the system selection signal generator 117 extracts the system selection information for selecting the 1-system from the downstream signals (OAM cells), and supplies it to the 2-1 selector 118 and routing section 119, so that the upstream signals are sent to the 1-system, and the downstream signals are selected from the 1-system.

As for the downstream processing of the OLT 100, the routing section 113 identifies the cells to be sent to the ONUs using ONU numbers assigned to individual ONUs, for example, and selects one of the 0-system and 1-system in response to the system selection information on each ONU fed from the system selection signal generator 115. As for the upstream processing, the selector 112 identifies the cells sent from the ONUs using the ONU numbers assigned to individual ONUs, for example, and selects one of the 0-system and 1-system signals in response to the system selection information on each ONU fed from the system selection signal generator 115, thereby carrying out the signal switching (multiplexing) between the 0-system and 1-system for each ONU independently. Thus, the switching on a one-by-one basis of the ONUs is carried out (on a one-by-one basis of the ONU numbers corresponding to the ONU).

Figure 3:
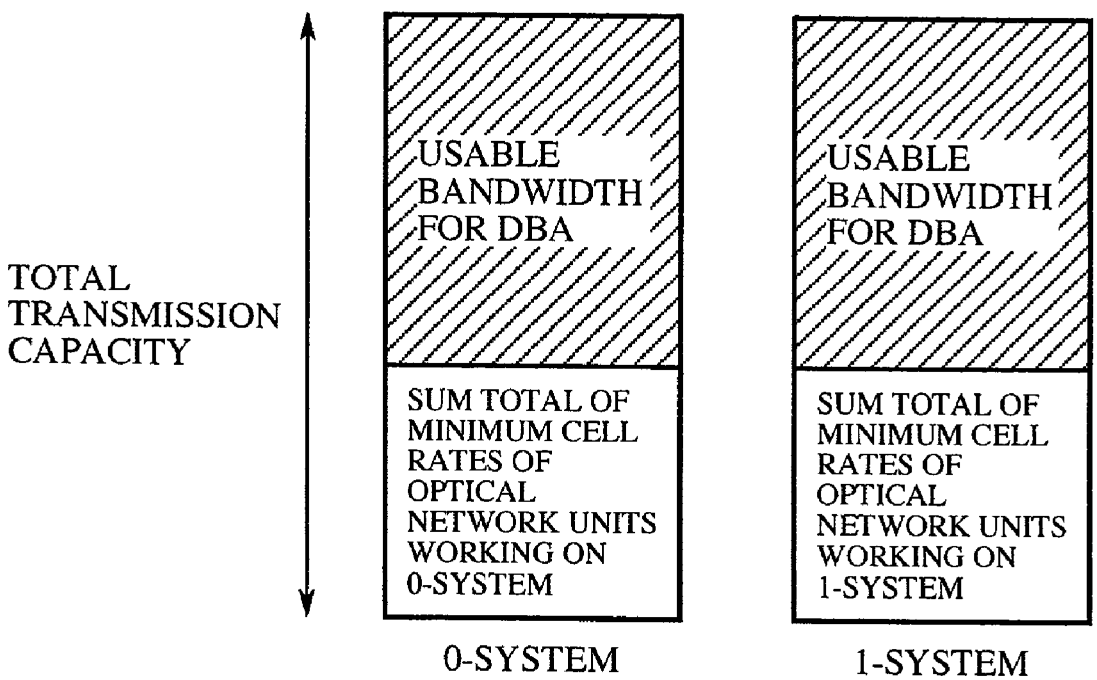
FIG. 3 is a schematic diagram illustrating an outline of the dynamic bandwidth assignment control method in the duplex PDS configuration.
Figure 14:
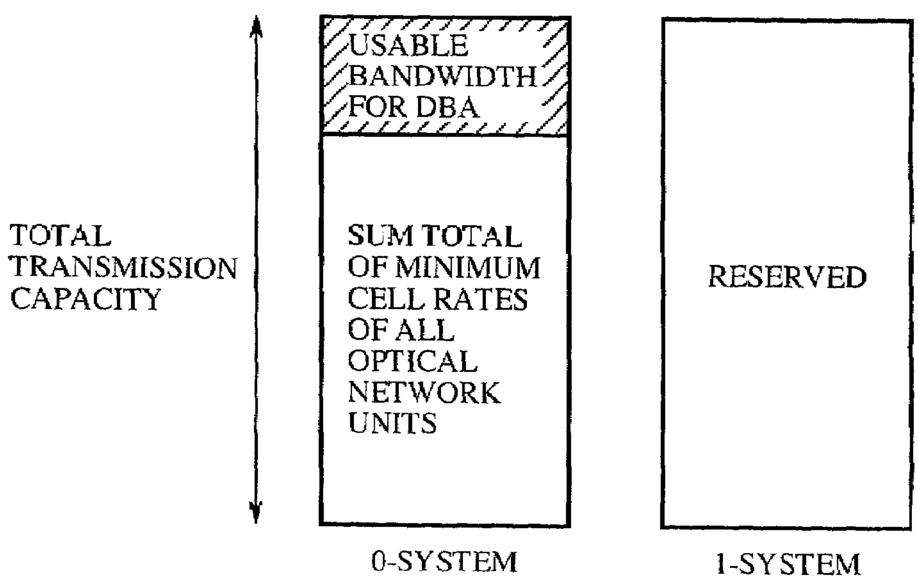
FIG. 14 is a schematic diagram illustrating an outline of the bandwidth assignment with conventional DBA.

FIG. 3 is a schematic diagram illustrating an outline of a dynamic bandwidth assignment method in the duplex PDS configuration. Referring to FIG. 3, the concept of the dynamic bandwidth assignment method will be described. In contrast to the conventional example of FIG. 14, the branch switching of the present embodiment 1 can utilize both the 0-system transmission line and 1-system transmission line as the working side. Thus, when starting the system or adding new ONUs, a setting is made such that some ONUs employ the 0-system as the working side (such ONUs are referred to as an ONU working on 0-system), and other ONUs employ the 1-system as the working side (such ONUs are referred to as an ONU working on the 1-system).

The bandwidth assignment is made as follows: First, a minimum transmission bandwidth is assigned to each ONU independently in either the 0-system or the 1-system when the two systems are normal. Second, the remaining bandwidth in both the systems is reserved as a dynamically assigned bandwidth so that when one of the two systems falls into a failure in any of the ONUs, their transmission bandwidths are secured dynamically in the dynamically assigned bandwidth of the normal system. For example, as illustrated in FIG. 3, when both the systems are normal, the ONUs are apportioned between the 0-system and 1-system such that the sum total of the minimum cell rates of the m ONUs working on the 0-system becomes nearly equal to that of the l (el) ONUs working on the 1-system, where m+l is the total number of the ONUs. In this way, the 1-system bandwidth becomes available as the bandwidth for DBA. This makes it possible to utilize the bandwidth effectively, and to increase the maximum bandwidth of the DBA available by all the ONUs in common.

Figure 1:
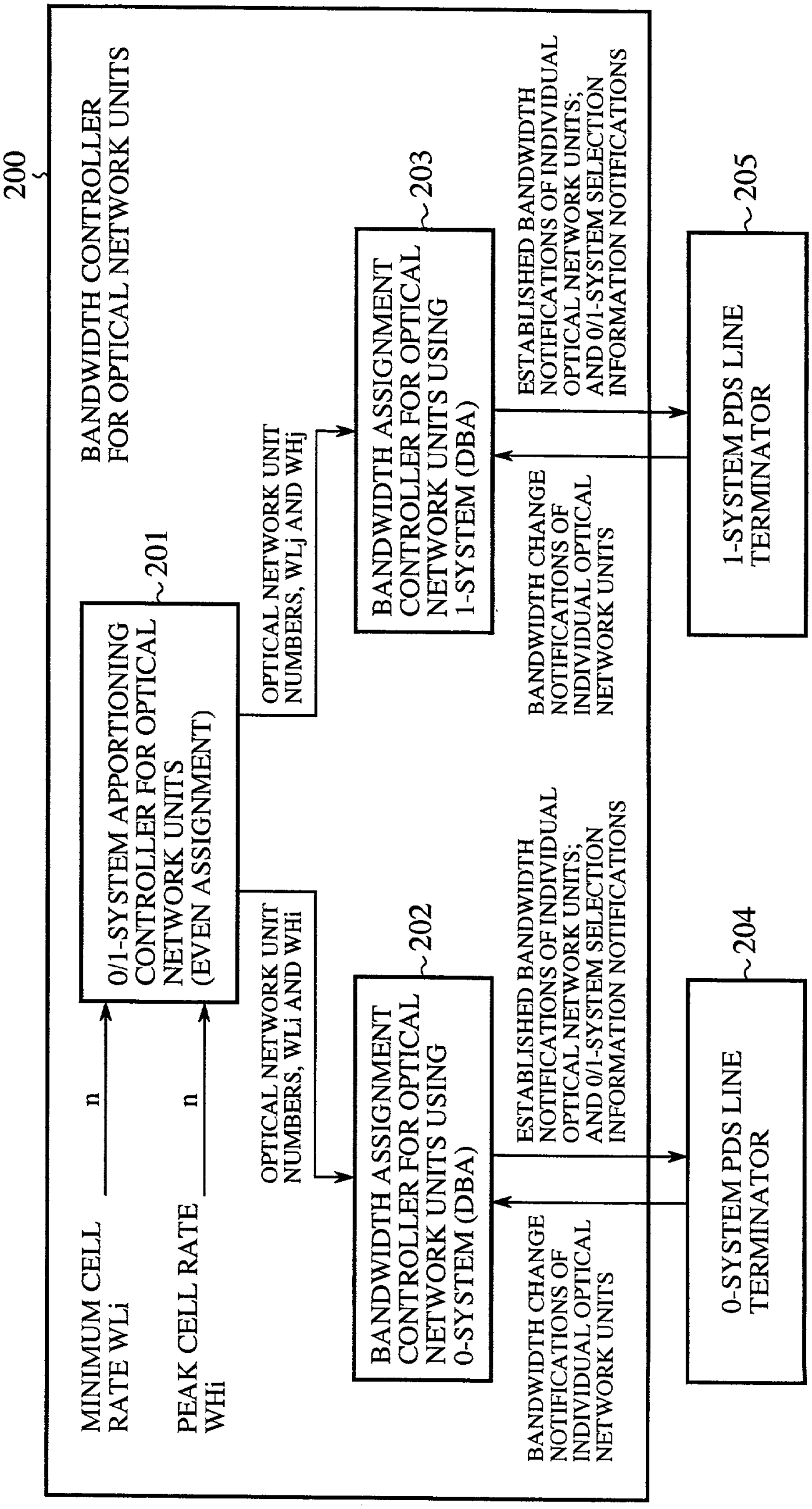
FIG. 1 is a block diagram showing a configuration for implementing a dynamic bandwidth assignment control method in a duplex PDS (passive double star) configuration in accordance with the present invention.

FIG. 1 is a block diagram showing a configuration for implementing the dynamic bandwidth assignment control method in the duplex PDS configuration. All the components of FIG. 1 are installed in the OLT 100. In this figure, the reference numeral 200 designates a bandwidth controller (bandwidth control means) for the ONUs; 201 designates a 0/1-system apportioning controller for the ONUs; 202 designates a bandwidth assignment controller for the ONUs using the 0-system; 203 designates a bandwidth assignment controller for the ONUs using the 1-system; 204 designates a 0-system PDS line terminator; and 205 designates a 1-system PDS line terminator.

Figure 2:
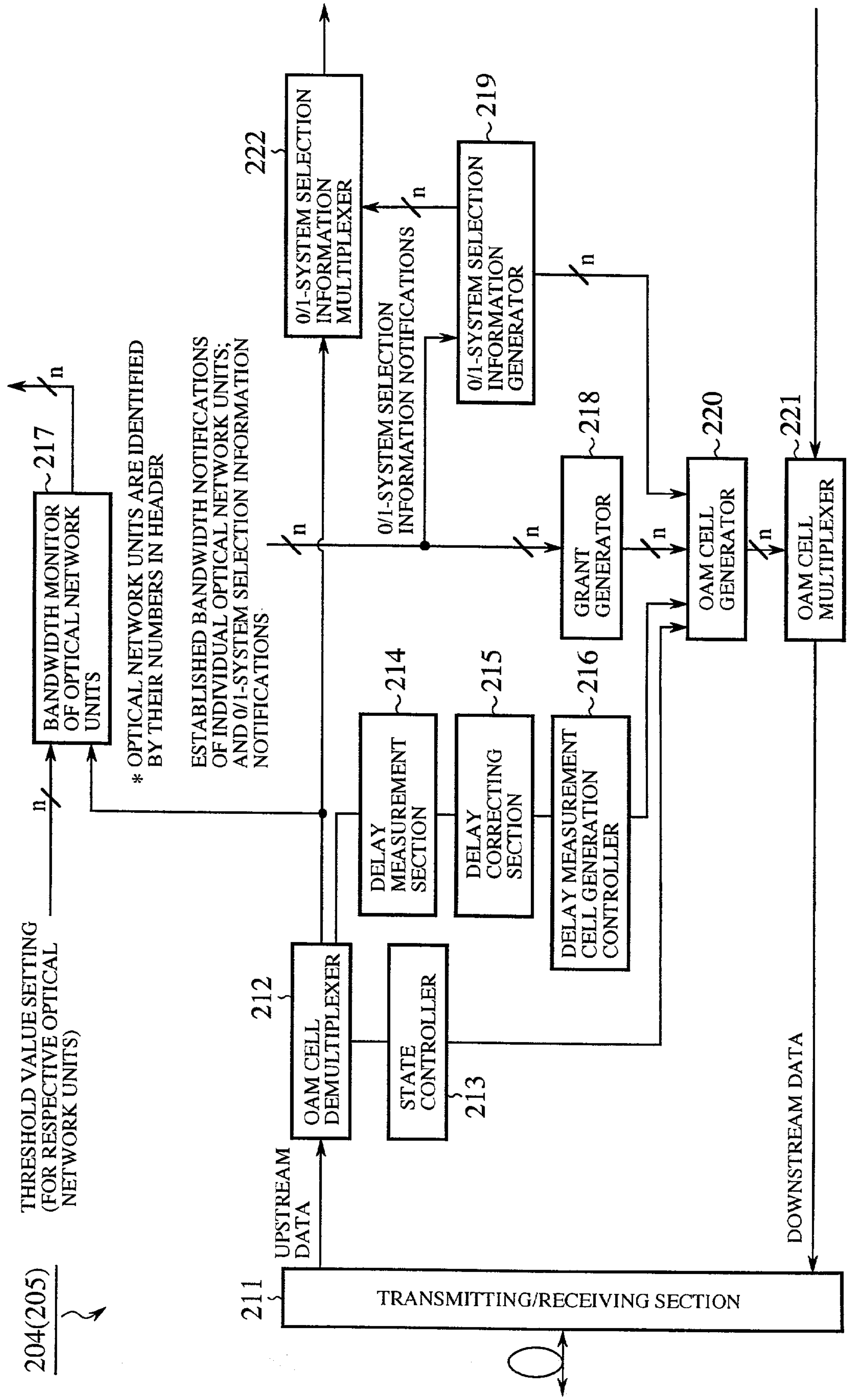
FIG. 2 is a block diagram showing a detailed configuration of the PDS line terminator as shown in FIG. 1.

FIG. 2 is a block diagram showing a detailed configuration of the PDS line terminator as shown in FIG. 1. In this figure, the reference numeral 211 designates a transmitting/receiving section, 212 designates an OAM cell demultiplexer, 213 designates a state controller, 214 designates a delay measurement section, 215 designates a delay correcting section, 216 designates a delay measurement cell generation controller, 217 designates a bandwidth monitor for the ONUs, 218 designates a grant generator, 219 designates a 0/1-system selection information generator, 220 designates an OAM cell generator, 221 designates an OAM cell multiplexer, and 222 designates a 0/1-system selection information multiplexer.

The 0/1-system apportioning controller 201 for the ONUs divides all the ONUs connected to the OLT to the ONUs working on 0-system and the ONUs working on the 1-system, when starting the duplex distribution network system or adding new ONUs. Specifically, the bandwidth assignment is made as follows: First, a minimum transmission bandwidth is assigned to each ONU independently in either the 0-system or 1-system when the two systems are normal; and second, the remaining bandwidth is reserved as a dynamically assigned bandwidth so that when one of the two systems fails in any of the ONUs, their transmission bandwidths are secured dynamically in the dynamically assigned bandwidth of the normal system.

For example, the division of the ONUs to the 0/1-system is made such that the sum total of the minimum cell rates WLi (i is a number from one to n) that are specified by the contract of the m ONUs working on the 0-system becomes nearly equal to the sum total of the minimum cell rates WLj (j is a number from one to n) that are specified by the contract of the l (el) ONUs working on the 1-system, where m+l is the total number of the ONUs. Thus, as for the bandwidth for DBA, the 0-system can secure the bandwidth equal to the maximum available bandwidth of the transmission line—(the sum total of the minimum cell rates WLi), and the 1-system can secure the bandwidth equal to the maximum available bandwidth of the transmission line—(the sum total of the minimum cell rates WLj). This makes it possible for the DBA to utilize the 1-system bandwidth, enabling the effective use of the bandwidth.

Furthermore, the 0/1-system apportioning controller 201 assigns a peak cell rate to each ONU, and supplies ONU numbers for identifying the ONUs and the set values of the minimum cell rates and peak cell rates to the bandwidth assignment controller 202 for the ONUs using the 0-system and to the bandwidth assignment controller 203 for the ONUs using the 1-system.

The bandwidth assignment controller 202 for the ONUs using the 0-system receives the ONU numbers together with the set values of the minimum cell rates and peak cell rates from the 0/1-system apportioning controller 201 for the ONUs, and carries out the DBA processing in response to the information. More specifically, in the normal operation, the bandwidth assignment controller 202 for the ONUs using the 0-system determines the bandwidth to be assigned to each ONU as follows from its ONU number and its minimum cell rate and peak cell rate fed from the 0/1-system apportioning controller 201 for the ONUs. The bandwidth assignment controller 202 determines the bandwidth of each ONU such that its established bandwidth becomes greater than the minimum cell rate and equal to or less than the peak cell rate, and the sum total of the bandwidths assigned to the ONUs does not exceed the maximum available bandwidth. Then, it notifies the 0-system PDS line terminator 204 of the established bandwidths of the individual ONUs, and of the 0/1-system selection information notification indicating as to whether the 0-system or 1-system is selected by the ONUs.

The 0-system PDS line terminator 204 generates a bandwidth change notification for each ONU when it detects that the cell bandwidth received from the ONU is greater or less than a predetermined threshold value, and supplies it to the bandwidth assignment controller 202 for the ONUs using the 0-system. Receiving the bandwidth change notification of each ONU from the 0-system PDS line terminator 204, the bandwidth assignment controller 202 for the ONUs using the 0-system increases the established bandwidth of the ONU, when the notification indicates a bandwidth greater than the threshold value, and the usable bandwidth for DBA is available. On the other hand, if the bandwidth is less than the threshold value, it can reduce the established bandwidth of the ONU. Here, the threshold value can take multiple values.

Furthermore, receiving the bandwidth change notifications about a plurality of the ONUs, from which the cell bandwidths greater than the threshold value are received, the bandwidth assignment controller 202 for the ONUs increases the established bandwidths of all the corresponding ONUs as long as the usable bandwidth for DBA is available. In contrast, when the usable bandwidth for DBA has only a small space available, it can be divided in proportion to the minimum cell rates, for example, to be assigned to the ONUs to increase their established bandwidths. Likewise, in the normal operation, the bandwidth assignment controller 203 for the ONUs using the 1-system determines the bandwidth to be assigned to each ONU as follows from its ONU number and its minimum cell rate and peak cell rate fed from the 0/1-system apportioning controller 201 for the ONUs. The bandwidth assignment controller 203 determines the bandwidth of each ONU such that the established bandwidth becomes greater than its minimum cell rate and equal to or less than its peak cell rate, and the sum total of bandwidths of the ONUs does not exceed the maximum available bandwidth. Then, it notifies the 1-system PDS line terminator 205 of the established bandwidths of the individual ONUs together with the 0/1-system selection information notifications indicating as to whether the 0-system or 1-system is selected by the ONUs.

The 1-system PDS line terminator 205 generates a bandwidth change notification for each ONU when it detects that the cell bandwidth received from the ONU is greater or less than a predetermined threshold value, and supplies it to the bandwidth assignment controller 203 for the ONUs using the 1-system. Receiving the bandwidth change notification of each ONU from the 1-system PDS line terminator 205, the bandwidth assignment controller 203 for the ONUs using the 1-system increases the established bandwidth of the ONU, when the notification indicates a bandwidth greater than the threshold value, and the usable bandwidth for DBA is available. On the other hand, if the bandwidth is less than the threshold value, it can reduce the established bandwidth of the ONU. Here, the threshold value can take multiple values.

Furthermore, receiving the bandwidth change notifications about a plurality of the ONUs, from which the cell bandwidths greater than the threshold value are received, the bandwidth assignment controller 203 for the ONUs increases the established bandwidths of all the corresponding ONUs as long as the usable bandwidth for DBA is available. In contrast, when the usable bandwidth for DBA has only a small space available, it can be divided in proportion to the minimum cell rates, for example, to be assigned to the ONUs to increase their established bandwidths.

Next, the operation of the PDS line terminator 204 or 205 as shown in FIG. 2 will be described.

When the OAM cell as a delay measurement cell is extracted by the OAM cell demultiplexer 212, the delay measurement section 214 measures the round-trip delay from the response of the delay measurement cell.

The delay measurement cell generation controller 216 computes the delay amount between the OLT and the ONU from the round-trip delay, generates the delay measurement value information about the delay amount, and supplies it to the OAM cell generator 220.

The OAM cell generator 220 places the delay measurement value information into the OAM cell, and the transmitting/receiving section 211 transmits it to the ONU. When the cell is sent back from the ONU within the normal location, the state controller 213 makes a decision that the ONU is in the operating state, and measures the delay amount of the upstream cell, so that the delay correcting section 215 carries out the fine adjustment of the delay amount. In contrast, when the cell is not sent back within the normal location, it makes a decision that the ONU is in the abnormal condition. The operation thus far is the same as that of the conventional system.

The transmitting/receiving section 211 optically multiplexes the downstream signals to the ONUs and the upstream signals from the ONUs, and the OAM cell demultiplexer 212 isolates the data cell and the OAM cells. The bandwidth monitor 217 for the ONUs monitors the bandwidth of the cells sent from each ONU, and compares it with a threshold value set for each ONU. The ONU is identified by its ONU number in the cell header, for example. When the bandwidth greater than or less than the threshold value is detected for a particular ONU by counting the number of incoming cells in a fixed period, for example, the bandwidth monitor 217 generates the bandwidth change notification for each ONU. The threshold value can take multiple values.

The grant generator 218 receives the established bandwidths and the 0/1-system selection information notifications of the ONUs from the bandwidth controller 200 for the ONUs, and generates grants that define the output timings of respective ONUs on the one-by-one basis of the ONUs.

The 0/1-system selection information generator 219 receives the 0/1-system selection information notifications from the bandwidth controller 200 for the ONUs, and generates the 0/1-system selection information notifications for the ONUs.

The OAM cell generator 220 multiplexes the grant information from the grant generator 218 and the 0/1-system selection information notifications from the 0/1-system selection information generator 219 into the OAM cell.

The OAM cell multiplexer 221 multiplexes the OAM cells generated by the OAM cell generator 220 into the downstream cells.

The 0/1-system selection information multiplexer 222 multiplexes the 0/1-system selection information notifications from the 0/1-system selection information generator 219 into the upstream cells.

The foregoing configuration that apportions the ONUs to the 0-system and 1-system makes it possible for the DBA to use the 1-system bandwidth, thereby enabling an effective use of the bandwidth, and increasing the maximum bandwidth of the DBA available by the ONUs.

Although the apportionment of the ONUs to the 0-system and 1-system is made such that the sum total of the minimum cell rates of the m ONUs working on the 0-system becomes nearly equal to that of the l (el) ONUs working on the 1-system, where m+l is the total number of the ONUs, this is not essential. For example, the apportionment of the ONUs to the 0-system and 1-system can be made such that the sum totals of the terms (peak cell rate—minimum cell rate) of both the systems become nearly equal.

Alternatively, it is also possible to apportion the ONUs to the 0-system and 1-system such that the sum totals of the peak cell rates of the two systems become nearly equal.

Furthermore, it can also be made such that the sum totals of the established bandwidths (values set between the minimum cell rate and the peak cell rate in the actual operation) of the two systems become nearly equal. This makes it possible for the OLT to establish the bandwidths matching the actual traffic.

Although the dynamic bandwidth assignment control method is applied to the system comprising two systems, the 0-system and 1-system, in the present embodiment 1, this is not essential. For example, it is applicable to a system including three or more systems.

Embodiment 2

Figure 5:
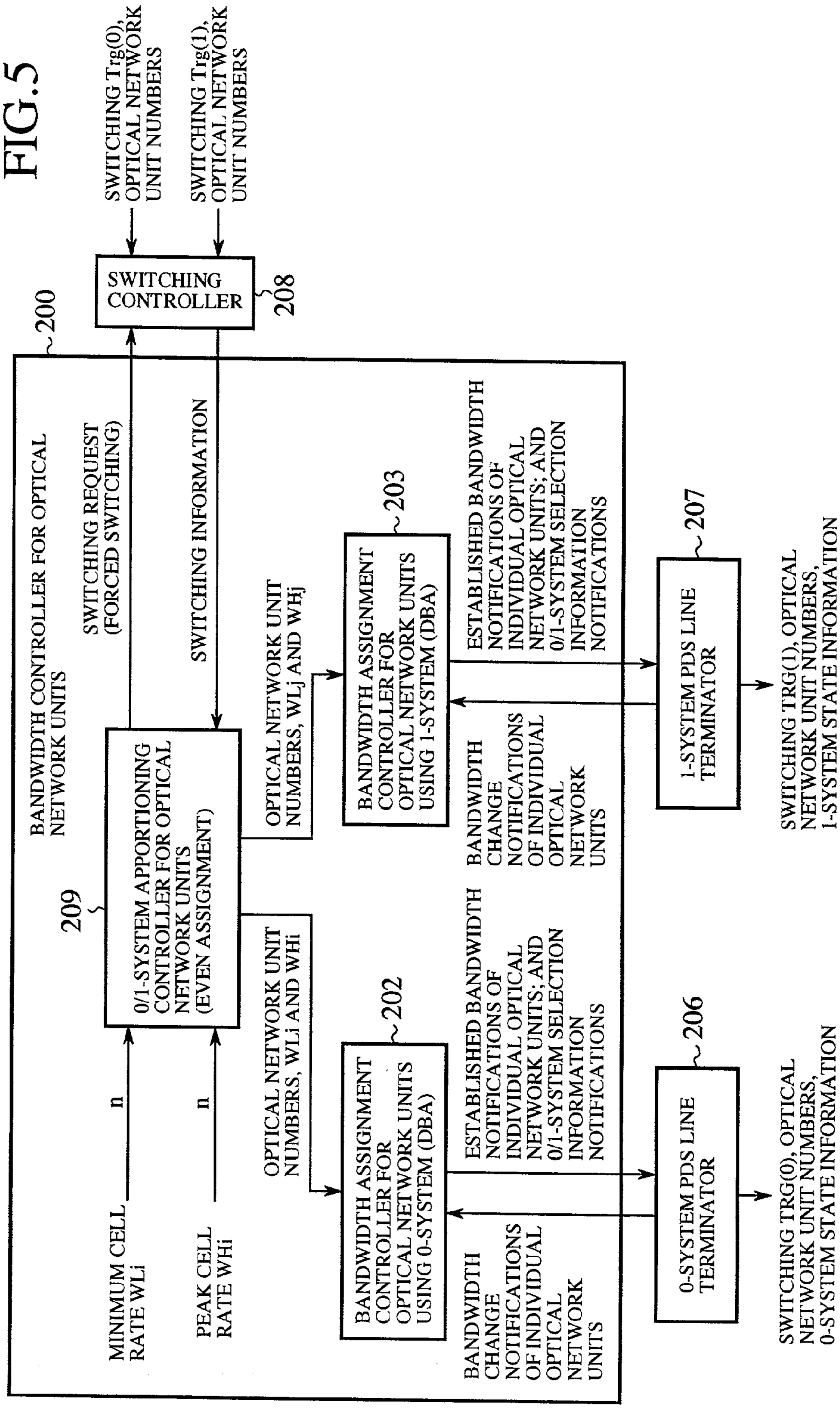
FIG. 5 is a block diagram showing a configuration for implementing a dynamic bandwidth assignment control method in a duplex PDS configuration in accordance with the present invention.
Figure 6:
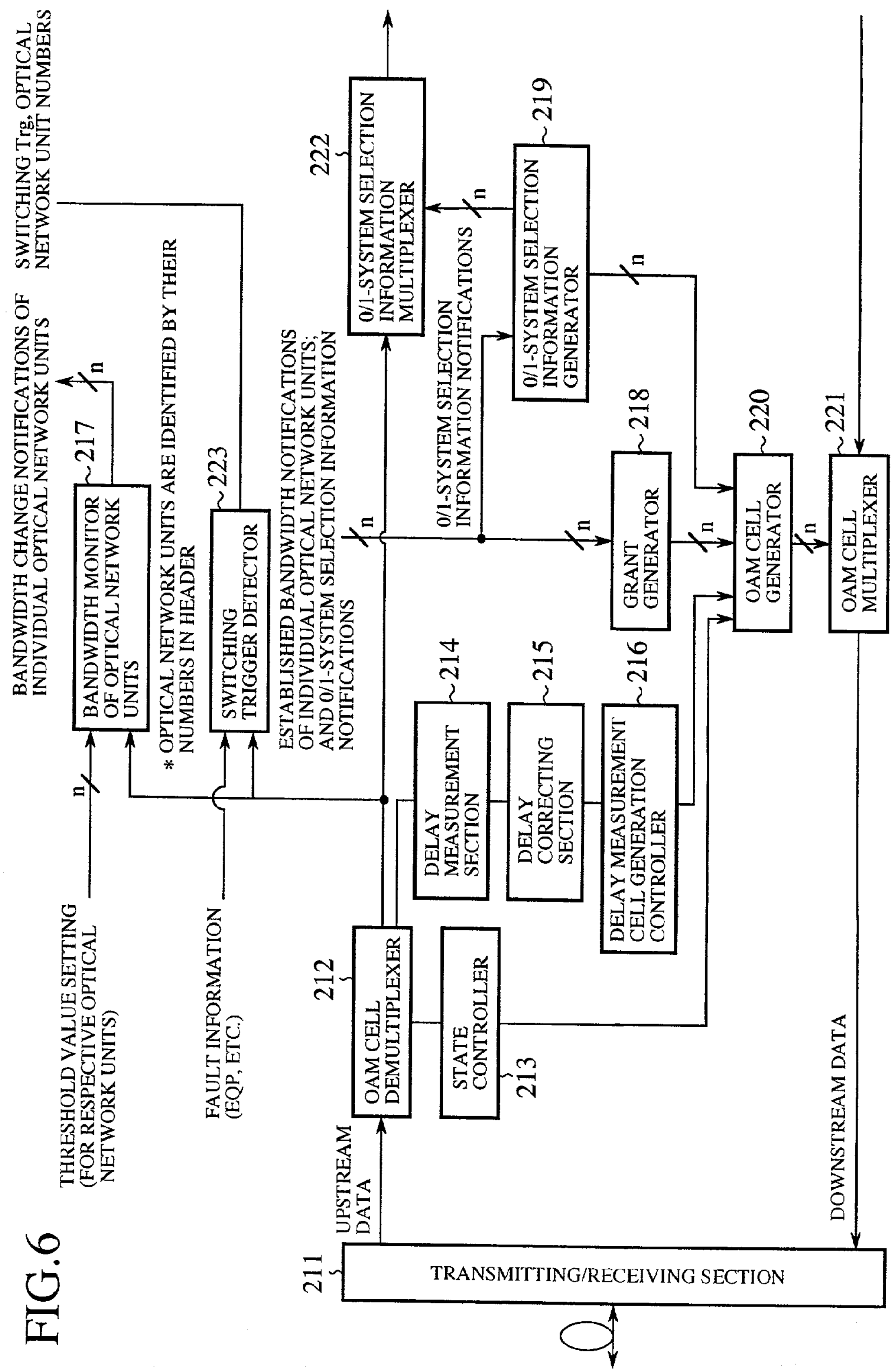
FIG. 6 is a block diagram showing a detailed configuration of the PDS line terminator as shown in FIG. 5.

FIG. 5 is a block diagram showing a configuration for implementing the dynamic bandwidth assignment control method in a duplex PDS configuration, and FIG. 6 is a block diagram showing a detailed configuration of the PDS line terminator as shown in FIG. 5. In FIGS. 5 and 6, the same or like portions to those of FIGS. 1 and 2 are designated by the same reference numerals, and the description thereof is omitted here.

The reference numeral 206 designates a 0-system PDS line terminator similar to the 0-system PDS line terminator 204 except that it outputs a switching trigger Trg(0) together with ONU numbers, and supplies them to a switching controller 208. The reference numeral 207 designates a 1-system PDS line terminator similar to the 1-system PDS line terminator 205 except that it outputs a switching trigger Trg(1) together with the ONU numbers, and supplies them to the switching controller 208.

The reference numeral 208 designates the switching controller that receives the switching trigger Trg(0) and ONU numbers from the 0-system PDS line terminator 206, and the switching trigger Trg(1) and ONU numbers from the 1-system PDS line terminator 207, that receives a forced switching request from a 0/1-system apportioning controller 209 for the ONUs, and generates switching information indicating one of the 0-system and the 1-system to which each ONU switches, and that supplies the information to the 0/1-system apportioning controller 209 for the ONUs, and actually controls the switching. The reference numeral 209 designates the 0/1-system apportioning controller for the ONUs that carries out the switching by generating the forced switching request for the switching controller 208 when it makes a decision from the switching information received from the switching controller 208 that the bandwidth apportionment between the 0-system and 1-system loses its balance because of the switching caused by a transmission line failure or the like, and hence at least one of the two systems cannot secure enough usable bandwidth for DBA, and that restructures the bandwidth apportionment balance between the 0-system and 1-system so that the two systems can secure enough usable bandwidth for DBA.

The reference numeral 223 designates a switching trigger detector for detecting a transmission line failure or logic card failure (EQP), and outputs the switching trigger Trg and ONU number about the corresponding ONU.

The switching trigger detector 223 of FIG. 6 detects, from the upstream data sent from each ONU, alarm information such as a break of a signal input to the ONU, and detects failure information on a logic card (device) and the like within the logic card (device). When the 0-system PDS line terminator 206 detects a failure occurred in the ONU, it outputs the switching trigger Trg(0), whereas when the 1-system PDS line terminator 207 detects a failure occurred in the ONU, it outputs the switching trigger Trg(1). These switching triggers Trg(0) and Trg(1) are supplied to the switching controller 208 along with the ONU number for identifying the ONU.

Receiving the switching trigger Trg(0) from the 0-system, the switching controller 208 switches the ONU to the 1-system when the standby side (the 1-system here) is normal. Likewise, receiving the switching trigger Trg(1) from the 1-system, the switching controller 208 switches the ONU to the 0-system when the standby side (the 0-system here) is normal. In this case, the switching controller 208 generates the switching information indicating the ONU switched, and sends it to the 0/1-system apportioning controller 209 for the ONUs.

When the 0/1-system apportioning controller 209 for the ONUs makes a decision that the balance between the sum totals of the minimum cell rates of the 0-system and 1-system is lost because of the switching, and hence at least one of the two systems cannot secure enough usable bandwidth for DBA (for example, when the usable bandwidth for DBA of one of the 0-and 1-systems becomes less than a predetermined threshold value because of the switching of the ONUs), the controller 209 decides one or more ONUs to be switched from the system having a smaller usable bandwidth for DBA to the other system. It is preferable that the ONUs to be switched have a large established bandwidth, and are normal in the 0-system or 1-system. Then, the 0/1-system apportioning controller 209 sends to the switching controller 208 the forced switching request to switch the ONUs to the other system. Thus switching the normal ONUs that are selected in the 0-system or 1-system enables the difference between the sum totals of the minimum cell rates of the 0-system and 1-system to be kept small, thereby securing enough usable bandwidth for DBAs in both the systems.

The switching controller 208, which decides the forced switching of the ONU to the other system when the other system is normal, supplies the 0/1-system apportioning controller 209 for the ONUs with the switching information (about carrying out the forced switching of the ONU to the other system).

Receiving the switching information (about carrying out the forced switching of the ONU to the other system), the 0/1-system apportioning controller 209 for the ONUs notifies the bandwidth assignment controller 202 for the ONUs using the 0-system and the bandwidth assignment controller 203 for the ONUs using the 1-system, of the minimum cell rate and peak cell rate of each ONU to be subjected to the reassignment to the 0-system and 1-system by the forced switching. Receiving the information, the bandwidth assignment controllers 202 and 203 notify the 0-system PDS line terminator 206 and 1-system PDS line terminator 207 of the established bandwidths of the respective ONUs to be subjected to the reassignment caused by the apportioning change. Receiving the information, the 0-system PDS line terminators 206 and 207 transmit the system selection information upstream by inserting it into the cell header, and the system selection information and bandwidth established information downstream by an OAM cell.

The switching controller 208 carries out the forced switching of the ONU to the other system. The remaining operation is the same as that of the foregoing embodiment 1.

The foregoing configuration enables the forced switching of the normal ONUs when at least one of the two systems cannot secure enough usable bandwidth for DBA because of the imbalance between the sum totals of the minimum cell rates of the 0-system and 1-system due to a failure or the like. Thus, it can regain the balance between the sum totals of the minimum cell rates of the 0-system and 1-system, making it possible for the two systems to secure enough usable bandwidth for DBA, and to increase the usable bandwidth for DBA.

Embodiment 3

Although the foregoing embodiment 1 carries out the switching and bandwidth assignment on an ONU basis, the present embodiment 3 carries them out on a VP (Virtual Path) basis. Since the ONU can establish a plurality of VPs, the selection between the 0-system transmission line and the 1-system transmission line can take place for each VP even within the same ONU.

Referring to FIG. 4, a configuration of a duplex optical distribution system for the VP-based switching will be described. Both the OLT and ONUs carry out the VP-based switching. It will take place that one VP in a particular ONU employs the 0-system transmission line as the working side, but another VP thereof uses the1-system transmission line as the working side. In FIG. 4, the ONU 101 is connected to the OLT 100 via the optical couplers 102*a* and 102*b*.

The 0-system signal termination 116*a* and 1-system signal termination 116*b* of the ONU 101 are connected to the optical couplers 102*a* and 102*b* through the optical fibers, and process the downstream signals from the OLT 100 to divide the services to n signals for individual LIMs, where n is the number of the LIMs. In addition, they extracts the system selection information on the 0/1-system transmission line for respective VPs from the OAM cells of the downstream signals. Besides, they send to the OLT 100 upstream signals each of which includes n signals that correspond to the LIMs and are multiplexed to the upstream signal.

The system selection signal generator 117 receives the system selection information on the 0/1-system transmission lines for respective VPs from the 0-system signal termination 116*a* and 1-system signal termination 116*b*, and supplies it to the 2-1 selector 118 for selecting downstream signals, and to the upstream routing section 119.

The 2-1 selector 118 selects one of two sets of n signals supplied from the 0-system signal termination 116*a* and 1-system signal termination 116*b* in response to the selection information for respective VPs from the system selection signal generator 117, and transmits the selected signals to the corresponding LIMs.

The routing section 119 routes a set of n upstream signals LIM1–LIMn to either the 0-system signal termination 116*a* or 1-system signal termination 116*b* in response to the system selection information on the individual VPs fed from the system selection signal generator 117.

The PDS-IF(0) 114*a* and PDS-IF(1) 114*b* of the OLT 100 are connected to the optical couplers 102*a* and 102*b* through optical fibers.

The system selection signal generator 115 generates system selection information on each VP from information about a fault of the transmission line. For example, if a transmission line failure of a VP operating on the 0-system is detected, and when the 1-system VP transmission line is normal, the system selection signal generator 115 generates the switching information to the 1-system VP, or vice versa. Then, the system selection signal generator 115 supplies the switching information to the selector 112 for selecting the upstream signal and to the downstream routing section 113.

The selector 112 selects one of the signals supplied from the PDS-IF(0) 114*a* and PDS-IF(1) 114*b* on one-by-one basis of the VPs in response to the system selection information on the 0/1-system transmission lines for individual VPs fed from the system selection signal generator 115.

The routing section 113 routes the input signal to one of the PDS-IF(0) 114*a* and PDS-IF(1) 114*b* on a one-by-one basis of the VPs in response to the system selection information for individual VPs fed from the system selection signal generator 115.

Next, a concrete operation will be described taking an example where two ONUs #1 and #2 are connected to the OLT 100.

Assume that the VP=0 of the ONU #1 uses the 0-system as the working side, and the VP=1 of the ONU #1 employs the 1-system as the working side. In this case, in the VP=1 of the ONU #1, the system selection signal generator 117 extracts the system selection information for selecting the 0-system from the downstream signal, and supplies it to the 2-1 selector 118 and routing section 119, so that the upstream signals are sent to the 0-system, and the downstream signals are also selected from the 0-system.

In the VP=1 of the ONU #1, the system selection signal generator 117 extracts the system selection information for selecting the 1-system from the downstream signal, and supplies it to the 2-1 selector 118 and routing section 119, so that the upstream signals are sent to the 1-system, and the downstream signals are also selected from the 1-system.

As for the downstream processing of the OLT 100, the routing section 113 selects one of the 0-system and 1-system signals by routing in response to the system selection information on individual VPs fed from the system selection signal generator 115. As for the upstream processing, the selector 112 carries out the signal selection in response to the system selection information on individual VPs fed from the system selection signal generator 115, thereby carrying out the signal switching (multiplexing) between the 0-system and 1-system for each of the VPs independently. Thus, the switching on a one-by-one basis of the VPs is carried out.

Figure 7:
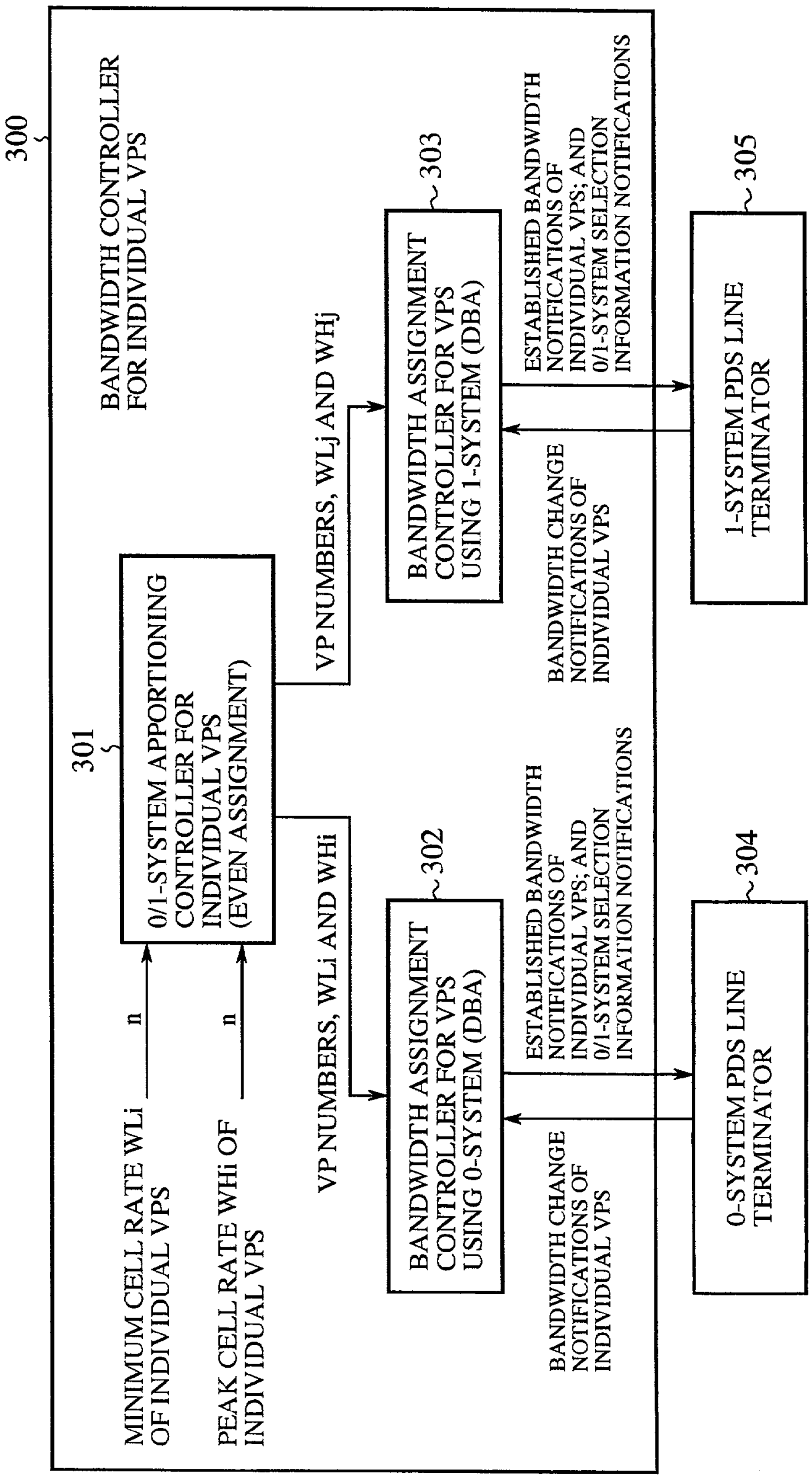
FIG. 7 is a block diagram showing a configuration for implementing a dynamic bandwidth assignment control method in a duplex PDS configuration in accordance with the present invention.

FIG. 7 is a block diagram showing a configuration for implementing the dynamic bandwidth assignment control method in the duplex PDS configuration. All the components of FIG. 7 are installed in the OLT 100. In FIG. 7, the reference numeral 300 designates a bandwidth controller (bandwidth control means) for individual VPs; 301 designates a 0/1-system apportioning controller for the individual VPs; 302 designates a bandwidth assignment controller for the VPs using the 0-system; 303 designates a bandwidth assignment controller for the VPs using the 1-system; 304 designates a 0-system PDS line terminator; and 305 designates a 1-system PDS line terminator.

Figure 8:
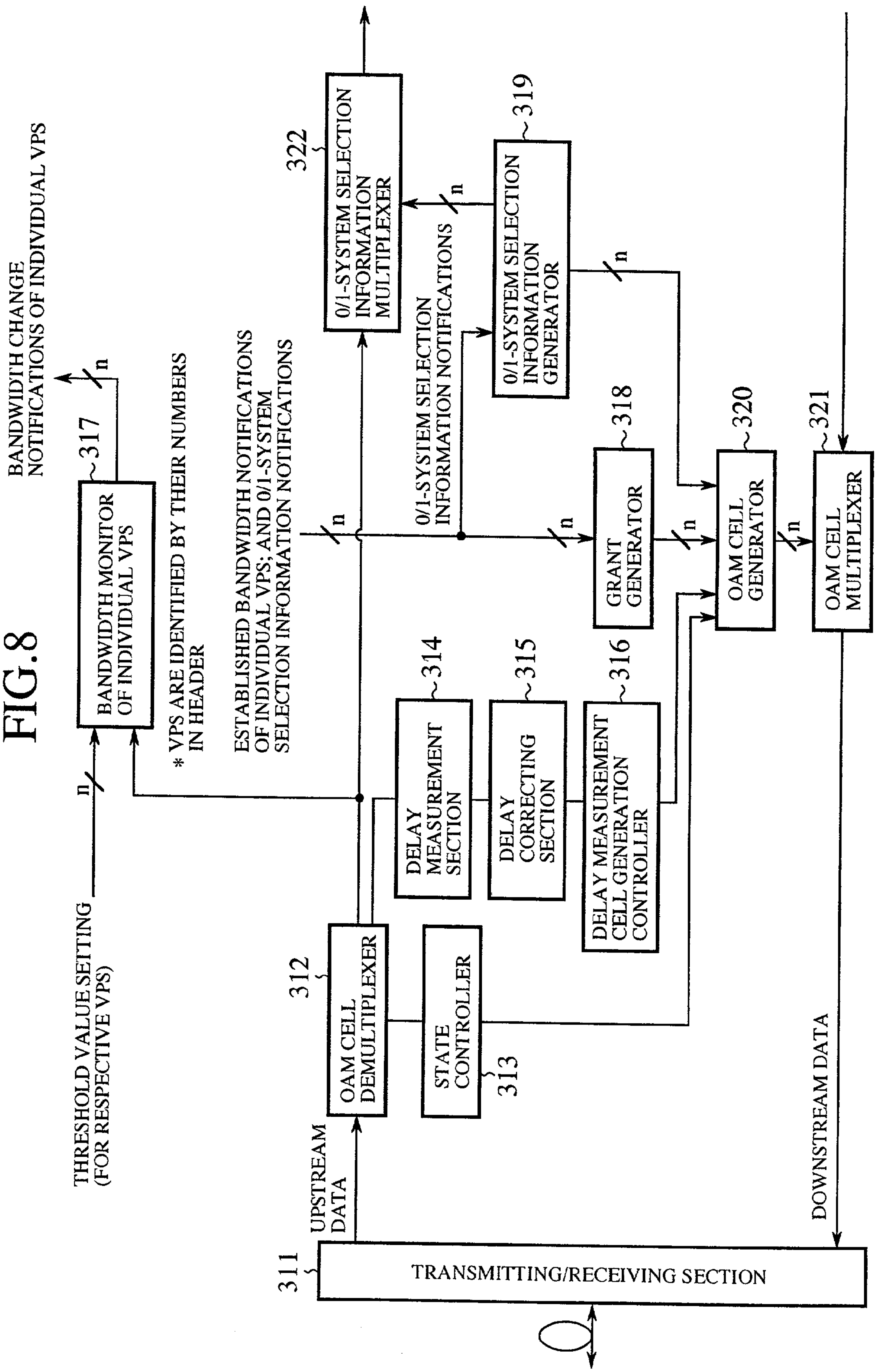
FIG. 8 is a block diagram showing a detailed configuration of the PDS line terminator as shown in FIG. 7.

FIG. 8 is a block diagram showing a detailed configuration of the PDS line terminator as shown in FIG. 7. In this figure, the reference numeral 311 designates a transmitting/receiving section, 312 designates an OAM cell demultiplexer, 313 designates a state controller, 314 designates a delay measurement section, 315 designates a delay correcting section, 316 designates a delay measurement cell generation controller, 317 designates a VP bandwidth monitor for detecting the bandwidth of each VP, 318 designates a grant generator, 319 designates a 0/1-system selection information generator, 320 designates an OAM cell generator, 321 designates an OAM cell multiplexer, and 322 designates a 0/1-system selection information multiplexer.

The 0/1-system apportioning controller 301 for individual VPs divides all the VPs to the VPs working on the 0-system and the VPs working on the 1-system when starting the duplex distribution network system or adding new VPs. Specifically, the bandwidth assignment is made as follows: First, a minimum transmission bandwidth is assigned to each VP independently in either the 0-system or 1-system when the two systems are normal; and second, the remaining bandwidth is reserved as a dynamically assigned bandwidth so that when one of the two systems fails in any of the VPs, their transmission bandwidths are secured dynamically in the dynamically assigned bandwidth of the normal system.

For example, the division of the VPs to the 0/1-system is made such that the sum total of the minimum cell rates WLi of the m VPs working on the 0-system becomes nearly equal to the sum total of the minimum cell rates WLi of the l (el) VPs working on the 1-system, where m is an arbitrary number between zero and n that is the total number of the VPs established, and m+l=n. Thus, as for the bandwidth for DBA, both the 0-system and 1-system can secure the bandwidth equal to the maximum available bandwidth—(the sum total of the minimum cell rates WLi), thereby making it possible for the DBA to utilize the 1-system bandwidth, and to make effective use of the bandwidth. Furthermore, the 0/1-system apportioning controller 301 determines the peak cell rates of the individual VPs, and supplies VP numbers for identifying the VPs along with the set values of the minimum cell rates and peak cell rates to the bandwidth assignment controller 302 for the VPs using the 0-system and to the bandwidth assignment controller 303 of the VPs using the 1-system.

The bandwidth assignment controller 302 for the VPs using the 0-system receives the VP numbers together with the set values of the minimum cell rates and peak cell rates from the 0/1-system apportioning controller 301 for the individual VPs, and carries out the DBA processing in response to the information. More specifically, in the normal operation, the bandwidth assignment controller 302 determines the bandwidth to be assigned to each VP from the VP number and the set values of the minimum cell rate and peak cell rate fed from the 0/1-system apportioning controller 301 for the individual VPs such that the established bandwidth of each VP becomes greater than the minimum cell rate and equal to or less than the peak cell rate, and the sum total of the bandwidths of the VPs does not exceed the maximum available bandwidth. Then, it transfers to the 0-system PDS line terminator 304 the established bandwidths of the individual VPs, along with the 0/1-system selection information notifications indicating one of the 0-system and 1-system to be selected by the individual VPs.

The 0-system PDS line terminator 304 generates a bandwidth change notification for each VP when it detects that the cell bandwidth received from the VP is greater or less than a predetermined threshold value, and supplies it to the bandwidth assignment controller 302 for the VPs using the 0-system. Receiving the bandwidth change notification of each VP from the 0-system PDS line terminator 304, the bandwidth assignment controller 302 for the VPs using the 0-system increases the established bandwidth of the VP, when the notification indicates that the bandwidth is greater than the threshold value, and the usable bandwidth for DBA is available. On the other hand, if the bandwidth is less than the threshold value, it can reduce the established bandwidth of the VP. Here, the threshold value can take multiple values.

Furthermore, receiving the bandwidth change notifications about the plurality of the VPs, from which the cell bandwidths greater than the threshold value are received, the bandwidth assignment controller 302 for the VPs using the 0-system increases the established bandwidths of all the corresponding VPs as long as the usable bandwidth for DBA is available. In contrast, when the usable bandwidth for DBA has only a small space available, it can be divided in proportion to the minimum cell rates, for example, to be assigned to the VPs to increase their established bandwidths.

Likewise, in the 1-system, the bandwidth assignment controller 303 of the VPs using the 1-system receives the VP numbers together with the set values of the minimum cell rates and peak cell rates from the 0/1-system apportioning controller 301 for the individual VPs, and carries out the DBA processing in response to the information. More specifically, in the normal operation, the bandwidth assignment controller 303 determines the bandwidth to be assigned to each VP from its VP number and the set values of its minimum cell rate and peak cell rate supplied from the 0/1-system apportioning controller 301 for the individual VPs such that the established bandwidth of each VP becomes greater than the minimum cell rate and equal to or less than the peak cell rate, and the sum total of bandwidths of the VPs does not exceed the maximum available bandwidth. Then, it transfers to the 1-system PDS line terminator 305 the established bandwidths of the individual VPs, along with the 0/1-system selection information notifications indicating one of the 0-system and 1-system to be selected by the individual VPs.

The 1-system PDS line terminator 305 generates a bandwidth change notification for each VP when it detects that the cell bandwidth received from the VP is greater or less than a predetermined threshold value, and supplies it to the bandwidth assignment controller 303 for the VPs using the 1-system. Receiving the bandwidth change notification of each VP from the 1-system PDS line terminator 305, the bandwidth assignment controller 303 for the VPs using the 1-system increases the established bandwidth of the VP, when the notification indicates that the bandwidth is greater than the threshold value, and the usable bandwidth for DBA is available. On the other hand, if the bandwidth is less than the threshold value, it can reduce the established bandwidth of the VP. Here, the threshold value can take multiple values.

Furthermore, receiving the bandwidth change notifications about the plurality of the VPs, from which the cell bandwidths greater than the threshold value are received, the bandwidth assignment controller 303 for the VPs using the 1-system increases the established bandwidths of all the corresponding VPs as long as the usable bandwidth for DBA is available. In contrast, when the usable bandwidth for DBA has only a small space available, it can be divided in proportion to the minimum cell rates, for example, to be assigned to the VPs to increase their established bandwidths.

Next, the operation of the configuration shown in FIG. 8 will be described.

When the OAM cell extracted by the OAM cell demultiplexer 312 includes a delay measurement cell, the delay measurement section 314 measures the round-trip delay from the response of the delay measurement cell.

The delay measurement cell generation controller 316 computes the delay amount between the OLT and the ONU from the round-trip delay, generates the delay measurement value information cell including information about the delay amount, and transmits it to the OAM cell generator 320.

The OAM cell generator 320 places the delay measurement value information cell into the OAM cell, and the transmitting/receiving section 311 transmits it to the ONU. When the cell is sent back from the ONU within the normal location, the state controller 313 makes a decision that the ONU is in the operating state, and measures the delay amount of the upstream cell, so that the delay correcting section 315 carries out the fine adjustment of the delay amount. In contrast, when the cell is not sent back within the normal location, it makes a decision that the ONU is in the abnormal condition. The operation thus far is the same as that of the conventional system.

The transmitting/receiving section 311 optically multiplexes the downstream signals to the ONUs and the upstream signals from the ONUs, and the OAM cell demultiplexer 312 isolates the data cell and the OAM cells.

The bandwidth monitor 317 for the individual VPs detects the bandwidth of the cells sent from each ONU, and compares it with a threshold value set for each VP. Detecting the bandwidth greater than or less than the threshold value for the VP (the VP is identified by the VP number, for example) by counting the number of incoming cells in a fixed period, for example, the bandwidth monitor 317 generates the bandwidth change notification for each VP. The threshold value can take multiple values.

The grant generator 318 receives the established bandwidth and the 0/1-system selection information notification of each VP from the bandwidth controller 300 for the individual VPs, and generates grants that define the output timings of the respective VPs on the one-by-one basis of the VPs.

The 0/1-system selection information generator 319 receives the 0/1-system selection information notification from the bandwidth controller 300 for the individual VPs, and generates the 0/1-system selection information for each of the VPs.

The OAM cell generator 320 multiplexes the grant information from the grant generator 318 and the 0/1-system selection information from the 0/1-system selection information generator 319 into the OAM cell.

The OAM cell multiplexer 321 multiplexes the OAM cells generated by the OAM cell generator 320 into the downstream cells.

The 0/1-system selection information multiplexer 322 multiplexes the 0/1-system selection information fed from the 0/1-system selection information generator 319 into the upstream cells on a one-by-one basis of the VPs.

The foregoing configuration that apportions the VPs to the 0-system and 1-system makes it possible for the DBA to use the 1-system bandwidth, thereby enabling an effective use of the bandwidth, and increasing the maximum bandwidth of the DBA available by the all the VPs in common.

Although the apportionment of the VPs to the 0-system and 1-system is made such that the sum total of the minimum cell rates of the m VPs working on the 0-system becomes nearly equal to that of the l (el) VPs working on the 1-system, where m+l is the total number of the ONUs, this is not essential. For example, the apportionment of the VPs to the 0-system and 1-system can be made such that the sum totals of the terms (peak cell rate—minimum cell rate) of both the systems become nearly equal.

Alternatively, it is also possible to apportion the VPs to the 0-system and 1-system such that the sum totals of the peak cell rates of the two systems become nearly equal.

Furthermore, it can also be made such that the sum totals of the established bandwidths of the VPs of the two systems become nearly equal. This makes it possible to establish the bandwidths matching the actual traffic.

Although the dynamic bandwidth assignment control method is applied to the system comprising the two systems, the 0-system and 1-system, in the present embodiment 3, this is not essential. For example, it is applicable to a system including three or more systems.

Embodiment 4

Figure 9:
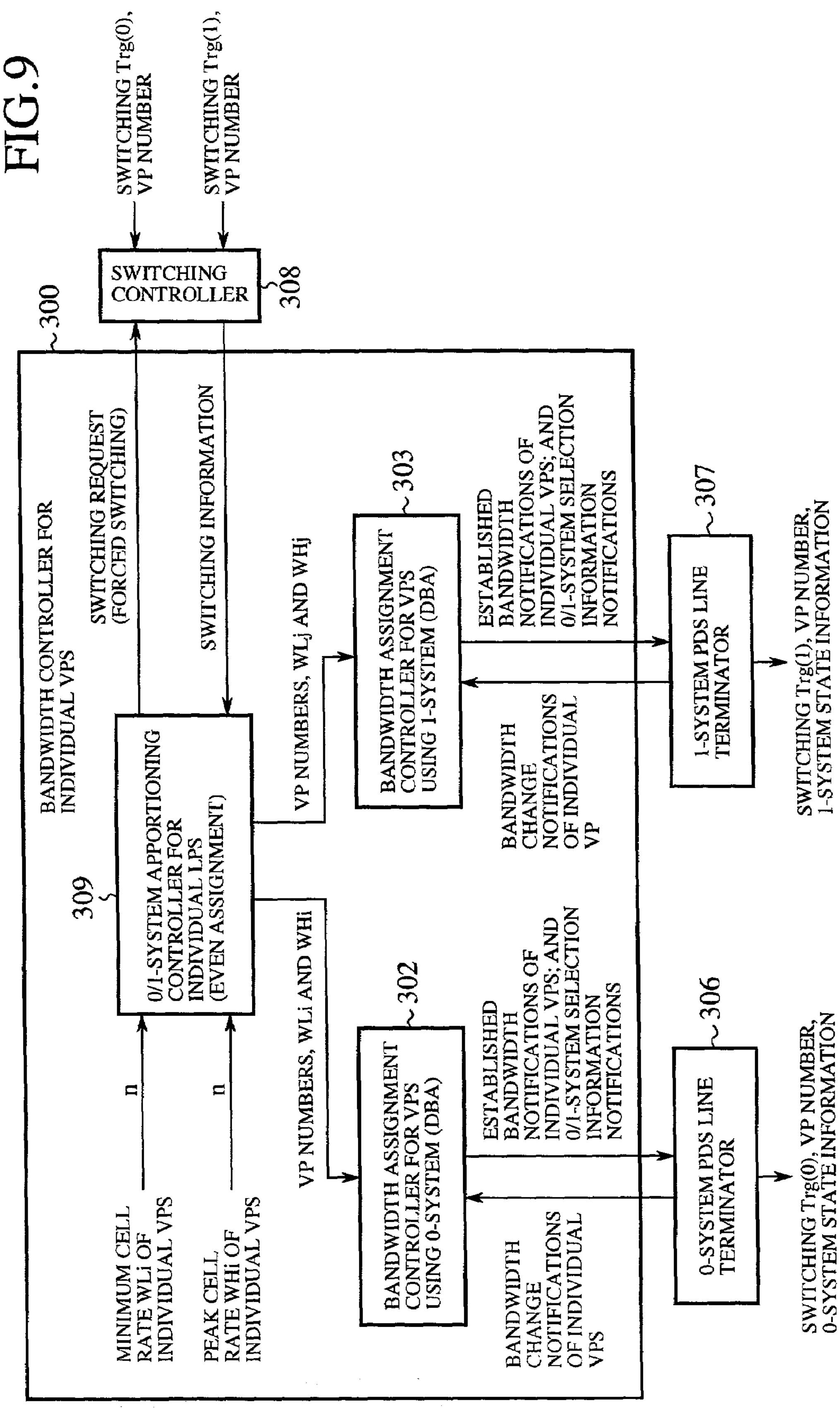
FIG. 9 is a block diagram showing a configuration for implementing a dynamic bandwidth assignment control method in a duplex PDS configuration in accordance with the present invention.
Figure 10:
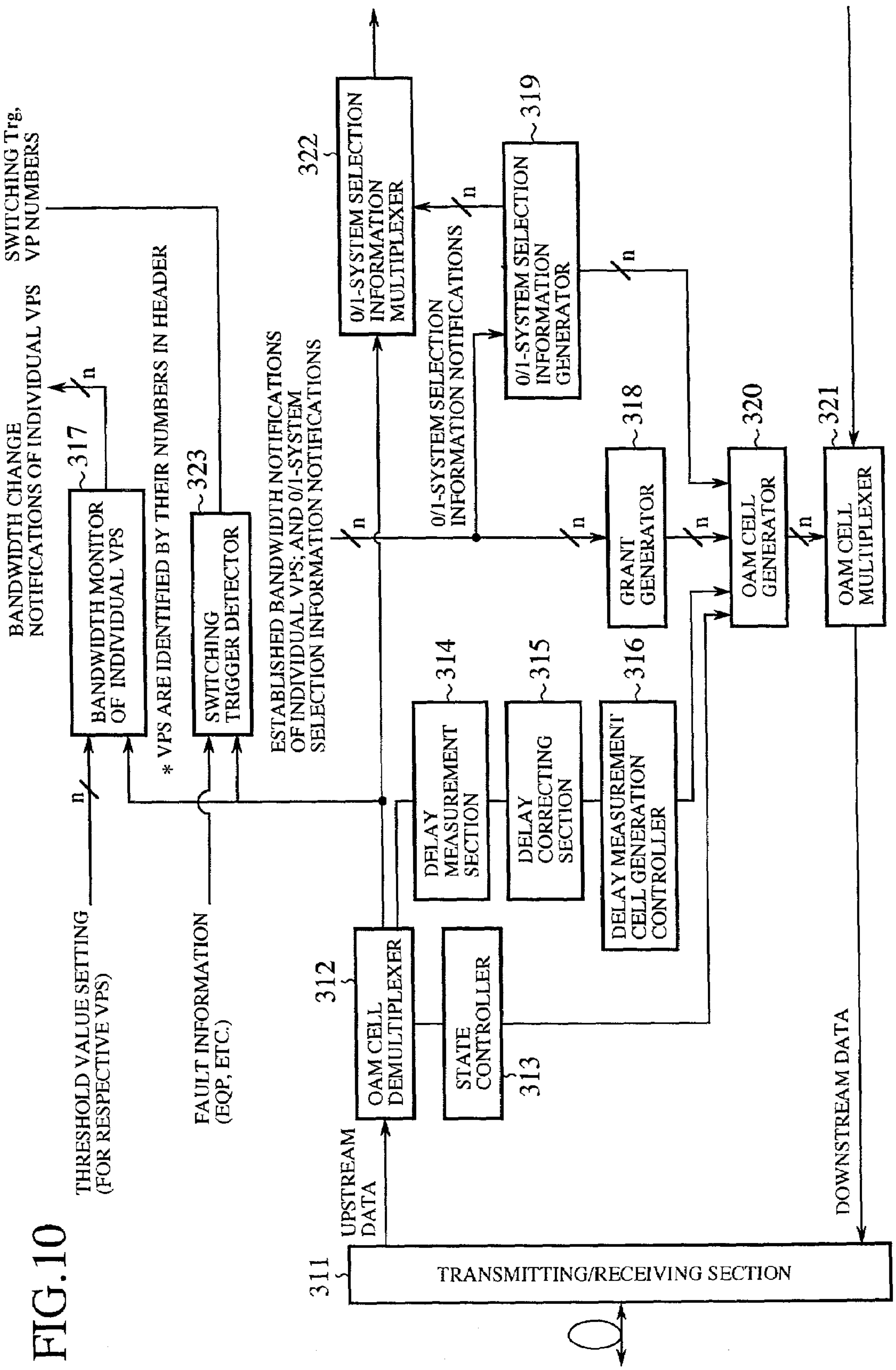
FIG. 10 is a block diagram showing a detailed configuration of the PDS line terminator as shown in FIG. 9.
Figure 11:
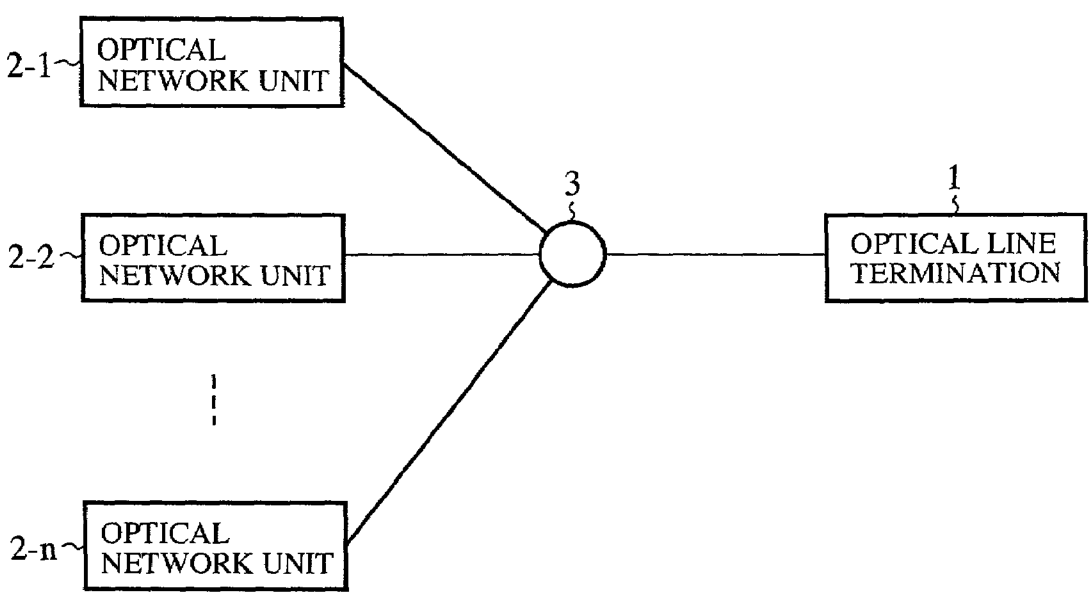
FIG. 11 is a block diagram showing a conventional optical distribution network system.
Figure 12:
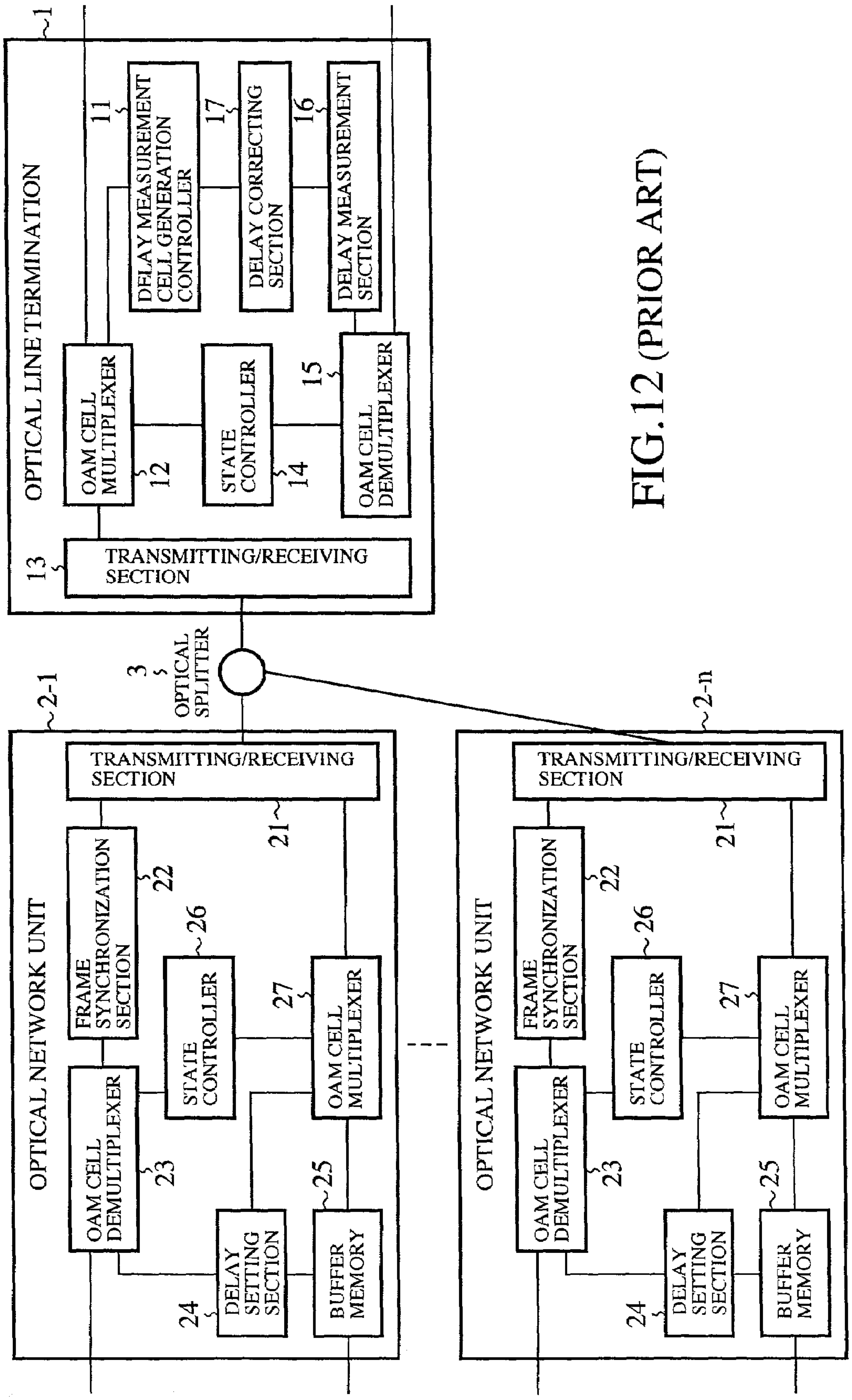
FIG. 12 is a block diagram showing a detailed configuration of the optical distribution network system of FIG. 11.
Figure 13:
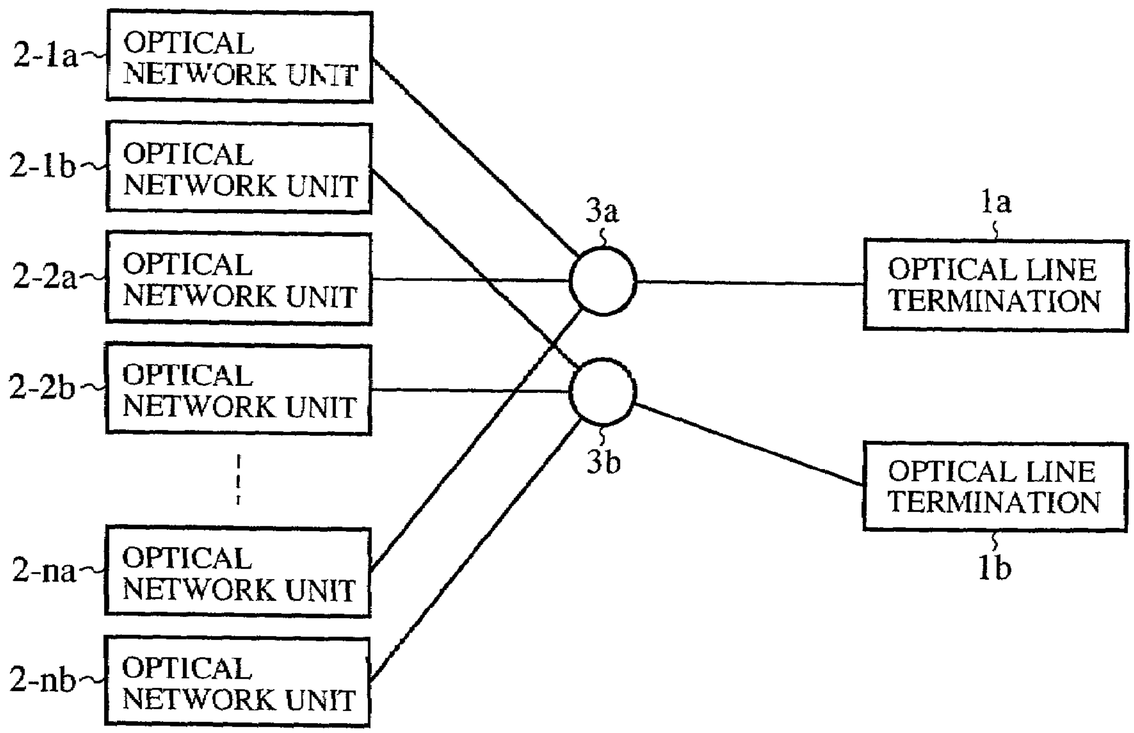
FIG. 13 is a block diagram showing a conventional duplex optical distribution network system that duplexes OLTs, ONUs and components between them.

FIG. 9 is a block diagram showing a configuration for implementing the dynamic bandwidth assignment control method in a duplex PDS configuration, and FIG. 10 is a block diagram showing a detailed configuration of a PDS line terminator as shown in FIG. 9. All the components of FIG. 9 are included in the OLT. In FIGS. 9 and 10, the same or like portions to those of FIGS. 7 and 8 are designated by the same reference numerals, and the description thereof is omitted here.

In FIG. 9, the reference numeral 306 designates a 0-system PDS line terminator similar to the 0-system PDS line terminator 304 except that it outputs a switching trigger Trg(0) and VP numbers, and supplies them to a switching controller 308. The reference numeral 307 designates a 1-system PDS line terminator similar to the 1-system PDS line terminator 305 except that it outputs a switching trigger Trg(1) and VP numbers, and supplies them to the switching controller 308.

The reference numeral 308 designates the switching controller that receives the switching trigger Trg(0) and VP numbers from the 0-system PDS line terminator 306, and the switching trigger Trg(1) and VP numbers from the 1-system PDS line terminator 307, that receives a forced switching request from a 0/1-system apportioning controller 309 for the individual VPs, and generates switching information indicating one of the 0-system and the 1-system to which each VP is switched, and that supplies the information to the 0/1-system apportioning controller 309 for the individual VPs, and actually controls the switching. The reference numeral 309 designates the 0/1-system apportioning controller for the individual VPs that carries out the switching by generating the forced switching request for the switching controller 308 when it makes a decision from the switching information received from the switching controller 308 that the bandwidth apportionment between the 0-system and 1-system loses its balance because of the switching caused by a transmission line failure or the like, and hence at least one of the two systems cannot secure enough usable bandwidth for DBA, and that regains the bandwidth apportionment balance between the 0-system and 1-system so that the two systems can secure enough usable bandwidth for DBA.

In FIG. 10, the reference numeral 323 designates a switching trigger detector for detecting a transmission line failure or logic card failure (EQP), and outputs the switching trigger Trg and VP number about the corresponding VP.

The switching trigger detector 323 of FIG. 10 detects alarm information on each VP such as a break of a signal input from the upstream data sent from the VP, and detects failure information on a logic card (device) and the like within the logic card (device). When it detects the failure in the 0-system PDS line terminator 306 for each VP, it outputs the switching trigger Trg(0) for the fault VP, whereas when it detects the failure in the 1-system PDS line terminator 307, it outputs the switching trigger Trg(1) for the fault VP. These switching triggers Trg(0) and Trg(1) are supplied to the switching controller 308 along with the VP numbers for identifying the VPs.

Receiving the switching trigger Trg(0) from the 0-system, the switching controller 308 switches the VP to the 1-system when the standby side (the 1-system here) is normal. Likewise, receiving the switching trigger Trg(1) from the 1-system, the switching controller 308 switches the VP to the 0-system when the standby side (the 0-system here) is normal. In this case, the switching controller 308 generates the switching information indicating the VP that is switched, and supplies it to the 0/1-system apportioning controller 309 for the individual VPs.

When the 0/1-system apportioning controller 309 for the individual VPs makes a decision that the balance between the sum totals of the minimum cell rates of the 0-system and 1-system is lost because of the switching, and hence at least one of the two systems cannot secure enough usable bandwidth for DBA (for example, when the usable bandwidth for DBA of one of the 0-system and 1-systems becomes less than a predetermined threshold value because of the switching of the VPs), the controller 309 decides one or more VPs to be switched from the system having a smaller usable bandwidth for DBA to the other system. It is preferable that the VPs to be switched have a large established bandwidth, and are normal in the 0-system or 1-system. Then, the 0/1-system apportioning controller 309 supplies the switching controller 308 with the forced switching request to switch the VPs to the other system. Thus switching the normal VPs that are selected in the 0-system or 1-system enables the difference between the sum totals of the minimum cell rates of the 0-system and 1-system to be kept small, thereby securing enough usable bandwidths for DBA in both the systems.

The switching controller 308 decides the forced switching of the ONU to the other system, when the other system is normal, and supplies the 0/1-system apportioning controller 309 for the individual VPs with the switching information (about carrying out the forced switching of the VP to the other system).

Receiving the switching information (about carrying out the forced switching of the VP to the other system), the 0/1-system apportioning controller 309 for the individual VPs notifies the bandwidth assignment controller 302 for the VPs using the 0-system and the bandwidth assignment controller 303 for the VPs using the 1-system, of the minimum cell rate and peak cell rate of each VP after the reassignment to the 0-system and 1-systems by the forced switching. Receiving the information, the bandwidth assignment controllers 302 and 303 notify the 0-system PDS line terminator 306 and 1-system PDS line terminator 307 of the established bandwidth of each VP subjected to the reassignment caused by the apportioning change. Receiving the information, the 0-system PDS line terminators 306 and 307 transmit the system selection information upstream by inserting it into the cell header, and the system selection information and bandwidth established information downstream by an OAM cell. The switching controller 308 carries out the forced switching of the VPs to the other system. The remaining operation is the same as that of the foregoing embodiment 3.

The foregoing configuration enables the forced switching of the normal VPs even when at least one of the two systems cannot secure enough usable bandwidth for DBA because of the imbalance between the sum totals of the minimum cell rates of the 0-system and 1-system due to a failure or the like, thereby regaining the balance between the sum total of the minimum cell rates of the 0-system and that of the 1-system to enable the two systems to secure enough usable bandwidth for DBA, and to increase the usable bandwidth for DBA.

What is claimed is:

1. An optical distribution network system comprising:

an OLT (optical line termination) device;

a plurality of ONUs (optical network units), wherein each of the plurality of ONUs are connected to the OLT via both first and second optical networks; and a bandwidth controller configured to apportion said plurality of ONUs between said first optical network and said second optical network, to assign a predetermined transmission bandwidth to each of said plurality of ONUs, and to accept a bandwidth change of the predetermined transmission bandwidth.

2. The optical distribution network system according to claim 1, wherein when a failure occurs in one of said first optical network and said second optical network, said bandwidth controller is configured to assign all transmission bandwidths of said ONUs to the other optical network.

3. The optical distribution network system according to claim 1, wherein when a failure occurs in a working side ONU of said plurality of ONUs, said bandwidth controller is configured to switch the working side ONU to a standby side, and to switch a standby side ONU to the working side.

4. The optical distribution network system according to claim 3, wherein when apportionment balance is lost of said plurality of ONUs between said first optical network and said second optical network, said bandwidth controller is configured to carry out apportionment of said plurality of ONUs between said first optical network and said second optical network, again.

5. The optical distribution network system according to claim 1, wherein said bandwidth controller is configured to assign a minimum cell rate to each of said plurality of ONUs.

6. The optical distribution network system according to claim 5, wherein said bandwidth controller is configured to apportion each of said plurality of ONUs to one of said first optical network and said second optical network such that a sum total of minimum cell rates of said ONUs in said first optical network becomes nearly equal to a sum total of minimum cell rates of said ONUs in said second optical network.

7. The optical distribution network system according to claim 5, wherein said bandwidth controller is configured to apportion each of said plurality of ONUs to one of said first optical network and said second optical network such that a sum total of peak cell rates of said ONUs in said first optical network becomes nearly equal to a sum total of peak cell rates of said ONUs in said second optical network.

8. The optical distribution network system according to claim 5, wherein said bandwidth controller is configured to apportion each of said plurality of ONUs to one of said first optical network and said second optical network such that a sum total of differences between peak cell rates and minimum cell rates of said ONUs in said first optical network becomes nearly equal to a sum total of differences between peak cell rates and minimum cell rates of said ONUs in said second optical network.

9. The optical distribution network system according to claim 5, wherein said bandwidth controller is configured to apportion each of said plurality of ONUs to one of said first optical network and said second optical network such that a sum total of established bandwidths of said ONUs in said first optical network becomes nearly equal to a sum total of established bandwidths of said ONUs in said second optical network.

10. An optical distribution network system comprising:
- an OLT (optical line termination) device;
- a plurality of ONUs (optical network units),
- wherein each of the plurality of ONUs are connected to the OLT via both first and second optical networks; and
- a bandwidth controller configured to apportion a plurality of paths contained in said plurality of ONUs between said first optical network and said second optical network, to assign a predetermined transmission bandwidth to each of said path, and to accept a bandwidth change of the predetermined transmission bandwidth.

11. The optical distribution network system according to claim 10, wherein when a failure occurs in one of said first optical network and said second optical network, said bandwidth controller is configured to assign all the paths contained in said plurality of ONUs to the other optical network.

12. The optical distribution network system according to claim 10, wherein when a failure occurs in a working side path of said plurality of paths, said bandwidth controller is configured to switch the working side path to a standby side, and to switch a standby side path to the working side.

13. The optical distribution network system according to claim 12, wherein when apportionment balance is lost of said plurality of paths between said first optical network and said second optical network, said bandwidth controller is configured to carry out apportionment of said plurality of paths between said first optical network and said second optical network, again.

14. The optical distribution network system according to claim 10, wherein said bandwidth controller is configured to assign a minimum cell rate to each of said plurality of paths.

15. The optical distribution network system according to claim 14, wherein said bandwidth controller is configured to apportion each of said plurality of paths to one of said first optical network and said second optical network such that a sum total of minimum cell rates of said paths in said first optical network becomes nearly equal to a sum total of minimum cell rates of said paths in said second optical network.

16. The optical distribution network system according to claim 14, wherein said bandwidth controller is configured to apportion each of said plurality of ONUs to one of said first optical network and said second optical network such that a sum total of peak cell rates of said paths in said first optical network becomes nearly equal to a sum total of peak cell rates of said paths in said second optical network.

17. The optical distribution network system according to claim 14, wherein said bandwidth controller is configured to apportion each of said plurality of paths to one of said first optical network and said second optical network such that a sum total of differences between peak cell rates and minimum cell rates of said paths in said first optical network becomes nearly equal to a sum total of differences between peak cell rates and minimum cell rates of said paths in said second optical network.

18. The optical distribution network system according to claim 14, wherein said bandwidth controller is configured to apportion each of said plurality of ONUs to one of said first optical network and said second optical network such that a sum total of established bandwidths of said paths in said first optical network becomes nearly equal to a sum total of established bandwidths of said paths in said second optical network.

19. A method for assigning bandwidth in an optical distribution network comprising:
- establishing a connection between a plurality of ONUs (optical network units) and an OLT (optical line termination) device via both first and second optical networks;
- apportioning said plurality of optical network units between said first optical network and said second optical network;
- assigning a predetermined transmission bandwidth to each of said plurality of optical network units; and
- accepting a bandwidth change of the predetermined bandwidth.

* * * * *